(12) United States Patent
Yamashita et al.

(10) Patent No.: US 7,828,111 B2
(45) Date of Patent: Nov. 9, 2010

(54) POWER STEERING SYSTEM

(75) Inventors: Masaharu Yamashita, Toyota (JP);
Masaki Fujimoto, Toyota (JP);
Takatoshi Saito, Toyota (JP); Shigeki Tashiro, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 71 days.

(21) Appl. No.: 12/089,917

(22) PCT Filed: Oct. 18, 2006

(86) PCT No.: PCT/IB2006/002913

§ 371 (c)(1),
(2), (4) Date: Apr. 11, 2008

(87) PCT Pub. No.: WO2007/049112

PCT Pub. Date: May 3, 2007

(65) Prior Publication Data

US 2008/0271942 A1    Nov. 6, 2008

(30) Foreign Application Priority Data

Oct. 28, 2005 (JP) ............................ 2005-314542
Nov. 18, 2005 (JP) ............................ 2005-334396

(51) Int. Cl.
*B62D 5/04* (2006.01)
(52) U.S. Cl. ...................................... 180/443; 180/446
(58) Field of Classification Search ................. 180/443, 180/446

See application file for complete search history.

(56) References Cited

U.S. PATENT DOCUMENTS

| 6,896,090 | B2* | 5/2005 | Kanda et al. | 180/402 |
| 6,899,196 | B2* | 5/2005 | Husain et al. | 180/402 |
| 6,926,112 | B2* | 8/2005 | Husain et al. | 180/402 |
| 6,932,184 | B2* | 8/2005 | Wittmeijer | 180/444 |
| 6,938,721 | B2* | 9/2005 | Ono et al. | 180/402 |
| 6,966,397 | B2* | 11/2005 | Yanaka | 180/315 |
| 2005/0082107 | A1* | 4/2005 | Husain et al. | 180/402 |

FOREIGN PATENT DOCUMENTS

| DE | 102 61 001 | 7/2004 |
| DE | 10 2004 050 014 | 6/2005 |
| JP | 9-323656 | 12/1997 |
| JP | 10-100927 | 4/1998 |
| JP | 2000 72007 | 3/2000 |
| JP | 2003 237597 | 8/2003 |
| WO | 2004 022411 | 3/2004 |

* cited by examiner

*Primary Examiner*—Kevin Hurley
*Assistant Examiner*—Tashiana Adams
(74) *Attorney, Agent, or Firm*—Oblon, Spivak, McClelland, Maier & Neustadt, L.L.P.

(57) ABSTRACT

A power steering system, which is disposed in the forward part of a vehicle, allows an electric motor to boost the steering torque applied by a driver, and transmits the steering torque to wheels via a steering transmission mechanism. The power steering system includes an impact detection device that detects the impact of an object on a rack housing that houses a rack bar constituting the steering transmission mechanism to detect the impact on the power steering system more accurately.

11 Claims, 16 Drawing Sheets

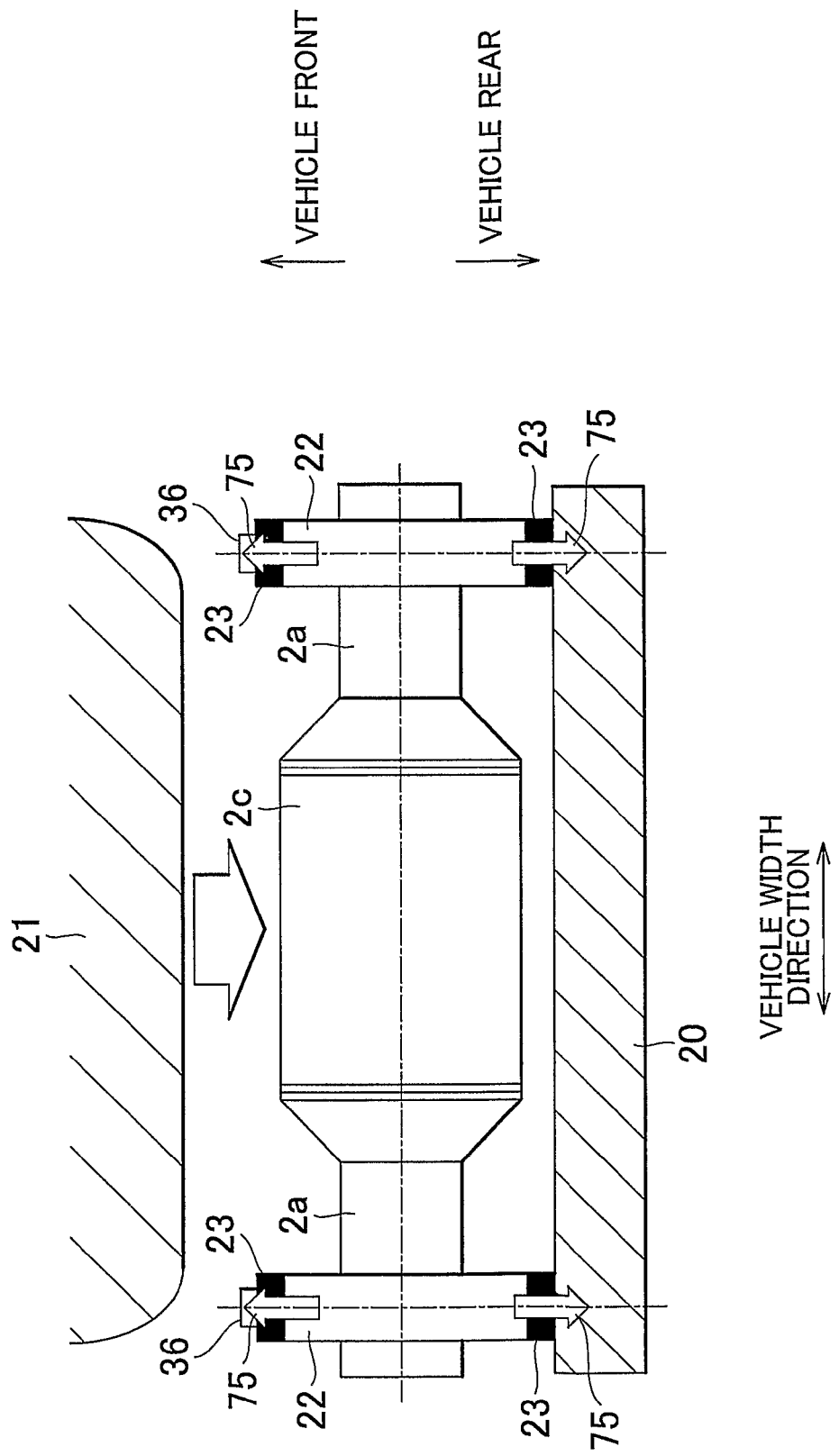

POWER STEERING SYSTEM

BACKGROUND OF THE INVENTION

1. Field of the Invention

The present invention relates to a power steering system that transmits the steering torque applied by a driver to wheels via a steering transmission mechanism while allowing an electric motor to boost the steering torque. More specifically, the present invention relates to a power steering system provided with a collision detecting function of detecting the impact of a peripheral component on the steering transmission mechanism.

2. Description of the Related Art

A power steering system has been available that is characterized by including: a torque sensor for detecting the steering torque applied via a steering wheel of a vehicle; a motor that performs driving operation to assist steering according to the detection signal from the torque sensor; a motor driver circuit that drives the motor; a power-supply switching means for switching on and off the power supply to the motor driver circuit; and a control circuit that allows the power-supply switching means to supply power when the motor driver circuit is made active, and that controls the driving of the motor that is performed by the motor driver circuit, according to the magnitude of the steering torque detected by the torque sensor, wherein a shock detection means for detecting the shock provided to the vehicle is provided to determine, from the detection signal from the shock detection means, whether the shock is caused by the collision of the vehicle, by using the control circuit, and, if it is determined that the shock is caused by the collision, driving the motor is stopped, and the power-supply switching means is allowed to cut off the power supply. Such a power steering system is disclosed in Japanese Patent Application Publication No. 2000-72007, for example. When it is determined that an object collides with the vehicle from the detection signal from a collision detector for an air bag system, the power steering system stops driving the motor for an Electric Power Steering (EPS), thereby preventing an overcurrent from flowing through the motor driver circuit.

However, the conventional electric power steering system determines from the detection signal from the collision detector for an air bag system whether the collision with the vehicle has occurred. For this reason, there is a possibility that, although the collision of an object with the vehicle is detected, the impact on the EPS mechanism itself cannot be accurately detected. In addition, there is a problem that the impact of a peripheral component on the steering transmission mechanism cannot be surely detected because the shock detection means for detecting the shock provided to the vehicle is not the sensor that directly detects the acceleration of the steering transmission mechanism but an acceleration sensor to be used to determine whether a passive safety device, such as the air bag system, should be activated.

SUMMARY OF THE INVENTION

In consideration of such a problem, the present invention provides a power steering system that can detect the impact on the steering transmission mechanism more accurately.

As an embodiment of the present invention, provided is a power steering system for allowing an electric motor to boost steering torque applied by a driver, and transmitting the steering torque to a wheel via a steering transmission mechanism, the power steering system including an impact detection device that detects an impact of an object on the steering transmission mechanism.

It is also preferable that the power steering system further include: an angle detection device that detects a first rotational angle of a rotary member constituting the steering transmission mechanism; and an angular speed calculating device that calculates an angular speed of the rotary member based on the detected first rotational angle, wherein the impact detection device detects the impact of a peripheral component on the steering transmission mechanism based on the calculated angular speed.

It is also preferable that the angle detection device includes a rotational angle sensor that detects a second rotational angle of the electric motor that assists a rack bar constituting the steering transmission mechanism in moving in an axial direction.

It is also preferable that the angle detection device includes a torque sensor that detects a steering torque based on a difference between rotational angles of a steering input shaft and an output shaft, which are connected to each other via a torsion bar constituting the steering transmission mechanism.

It is also preferable that the impact detection device detects an impact by discriminating a vibration due to the impact of the peripheral component on the steering transmission mechanism from a vibration that occurs in the steering transmission mechanism due to a backward input from the wheel.

It is also preferable that the impact of the vibration of the steering transmission mechanism due to the impact of the peripheral component be discriminated from the vibration of the steering transmission mechanism due to the backward input from the wheel, based on a changing pattern and/or frequency characteristics of an angular speed signal output from the angular speed calculating device.

It is also preferable that the vibration of the steering transmission mechanism due to the impact of the peripheral component be discriminated from the vibration of the steering transmission mechanism due to the backward input from the wheel by using an output signal from the torque sensor for detecting the steering torque.

It is also preferable that the vibration of the steering transmission mechanism due to the impact of the peripheral component be discriminated from the vibration of the steering transmission mechanism due to the backward input from the wheel by using a difference between the output signals each of which is sent from one of a pair of the rotational angle sensors one of which is provided for the steering input shaft, and the other of which is provided for the output shaft, the steering input shaft and the output shaft being connected to each other via the torsion bar.

It is also preferable that the impact detection device detects an impact load applied to a fastening point of the rack housing. In this case, it is also preferable that the impact detection device detects the impact load by using a strain sensor.

It is also preferable that the impact detection device detects a deformation of a stress concentration area of the rack housing. It is also preferable that the impact detection device detects the deformation by using a film sensor a resistance value of which varies according to the deformation of the stress concentration area of the rack housing. It is also preferable that the impact detection device detects the deformation by using a conduction sensor that is broken when the stress concentration area of the rack housing is deformed a predetermined amount or more.

It is also preferable that the impact detection device detects a displacement of the rack housing, relative to a vehicle body. In this case, it is also preferable that the impact detection device detects the relative displacement by using a stroke sensor, or by using a limit switch an output signal of which is changed when the relative displacement is equal to or greater than a predetermined displacement.

It is also preferable that, when the impact detection device detects the impact of the object on the rack housing, a mode of controlling a steering assist torque to be applied to the rack bar be changed. In this case, It is also preferable that the change of the control mode be a change of the operational state of the electric motor between a stopped state and a driven state, for example.

BRIEF DESCRIPTION OF THE DRAWINGS

The features, advantages thereof, and technical and industrial significance of this invention will be better understood by reading the following detailed description of preferred embodiments of the invention, when considered in connection with the accompanying drawings, in which:

FIG. 19 is a diagram showing an example of the configuration in which load sensors are disposed between the suspension member and the EPS mounts, and on fastening bolts.

DETAILED DESCRIPTION OF THE PREFERRED EMBODIMENTS

In the following description and the accompanying drawings, the present invention will be described in more detail with reference to exemplary embodiments. It should be noted that, with regard to electric power steering systems, the basic concept, the main hardware configuration, the operational principal, the basic control method and the like thereof are known to those skilled in the art, and detailed description thereof will therefore be omitted.

Figure 1:
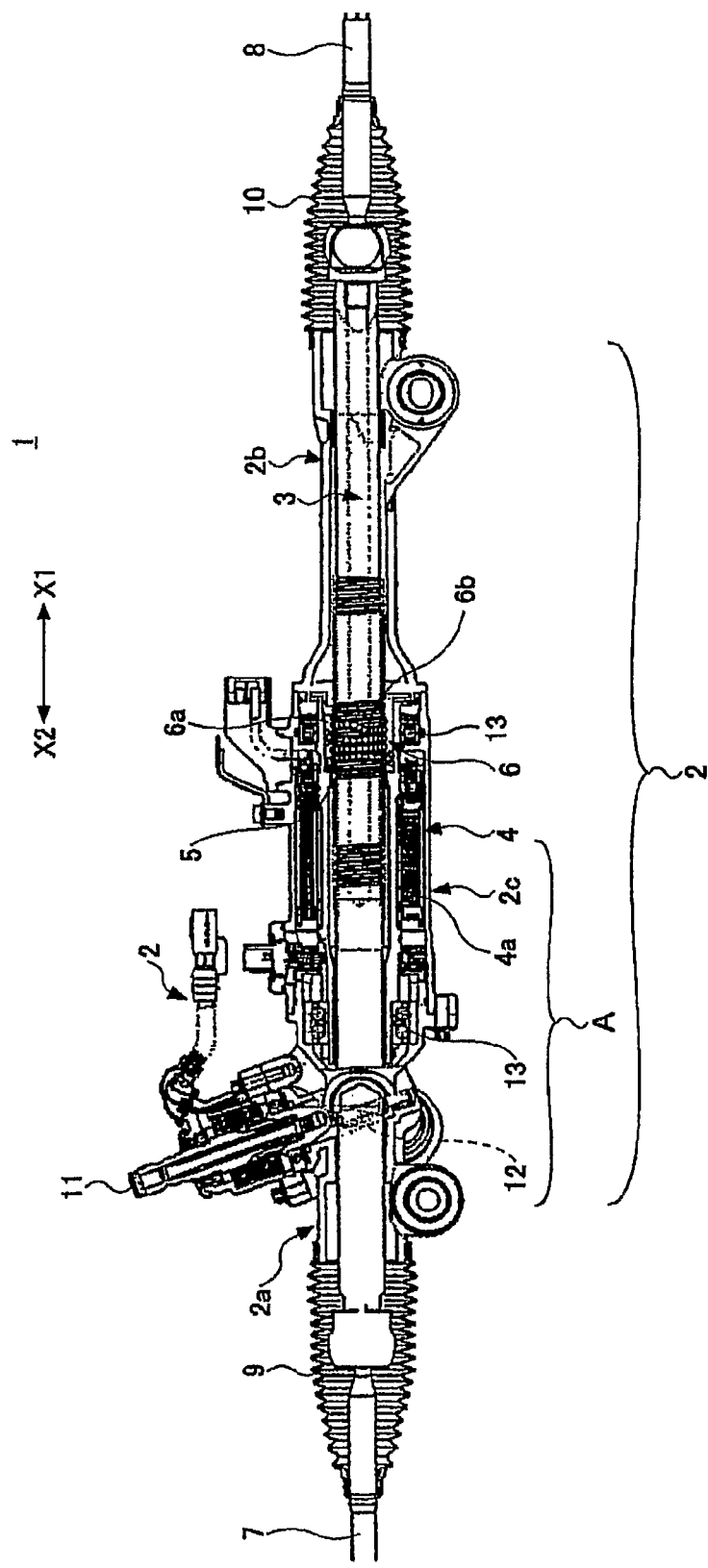
FIG. 1 is a schematic diagram of a power steering system of an embodiment of the present invention.

FIG. 1 is a schematic diagram of a power steering system of an embodiment of the present invention. The power steering system 1 generally includes: a rack housing 2; a rack shaft 3; an electric motor (herein also referred to as the assist motor) 4; a rotor (herein also referred to as the motor shaft) 5; and a ball screw mechanism 6. The rack housing 2 is constituted of hollow cylindrical first and second rack housings 2$a$ and 2$b$, and a yoke housing (herein also referred to as the main housing) 2$c$ placed between the rack housings 2$a$ and 2$b$. The housings 2$a$ to 2$c$ are coaxially joined by bolts or the like.

The rack shaft 3 is caused to extend through the rack housing 2 movably in the axial direction (the direction indicated by the arrow X1-X2 in FIG. 1). Both ends of the rack shaft 3 protruding from the first and second rack housings 2$a$ and 2$b$ are coupled to right and left front wheels via tie rods 7 and 8. Bellows 9 and 10, which can expand and contract as well as bend, are attached between the first rack housing 2$a$ and the tie rod 7, and between the second rack housing 2$b$ and the tie rod 8, respectively. The bellows 9 and 10 shut off the inside of the rack housing 2 from the outside.

A pinion 12 joined to an input shaft 11, which is connected to the steering wheel, is disposed in the first rack housing 2$a$, and engages with rack teeth (not shown) formed in the rack shaft 3. Accordingly, when a driver operates a steering wheel, the control force causes the pinion 12 to rotate via the input shaft 11, and the rotation of the pinion 12 is converted into the linear motion of the rack shaft 3 because of the engagement of the pinion 12 with the rack teeth. In this way, the front wheels are steered via the tie rods 7 and 8.

The electric motor 4 is disposed around the rack shaft 3 in the main housing 2$c$ constituting the rack housing 2, and has a function of applying steering assist force to the rack shaft 3 via the rotor 5 as described later. The electric motor 4 is a brushless DC motor, and includes a stator 4a, which is a stationary portion, and the rotor 5, which is a rotary portion. A coil is wounded around the stator 4a, which is disposed in the main housing 2c.

The rotor 5 has a hollow cylindrical shape, and is coaxially placed around the rack shaft 3 so that there is play therebetween. The rotor 5 is rotatably supported by the first rack housing 2a and the main housing 2c via a bearing 13 at a predetermined position.

The ball screw mechanism 6 is disposed near the end portion of the rotor 5 on the arrow X1 side in FIG. 1. The ball screw mechanism 6 includes a ball screw nut 6a, and balls 6b.

Brief description will now be given of the functions of the power steering system 1. The steering torque applied by a driver is applied when the driver turns the steering wheel 15, whereby the steering shaft (herein also referred to as the input shaft) 11 is rotated (see FIG. 4). The rotation of the steering shaft 11 is converted into the linear motion of the rack bar 3 (see FIGS. 1 to 3) by the rack and pinion engagement. The linear motion of the rack bar 3 causes the linear motion of the tie rods 7 and 8 (see FIGS. 1 and 4), which realizes the wheel steering.

A controller 50 is constituted of a microcomputer including a CPU, a ROM and a RAM, which are connected to one another via a bus. The ROM stores programs and the like that are executed by the CPU. Various kinds of information providing devices, such as a vehicle speed sensor, are connected to the controller 50 via an appropriate bus, such as the CAN (Controller Area Network). The controller 50 determines the value of an assisting electric current to be supplied to the assist motor 4, based on the steering torque and the vehicle speed. Typically, the assisting electric-current value is determined so that the assist force is increased in proportion to the increase in the steering torque applied by the driver, but, when the vehicle speed is high, the assisting electric-current value is determined so that the assist force is less than that applied when the vehicle speed is low.

Figure 2:
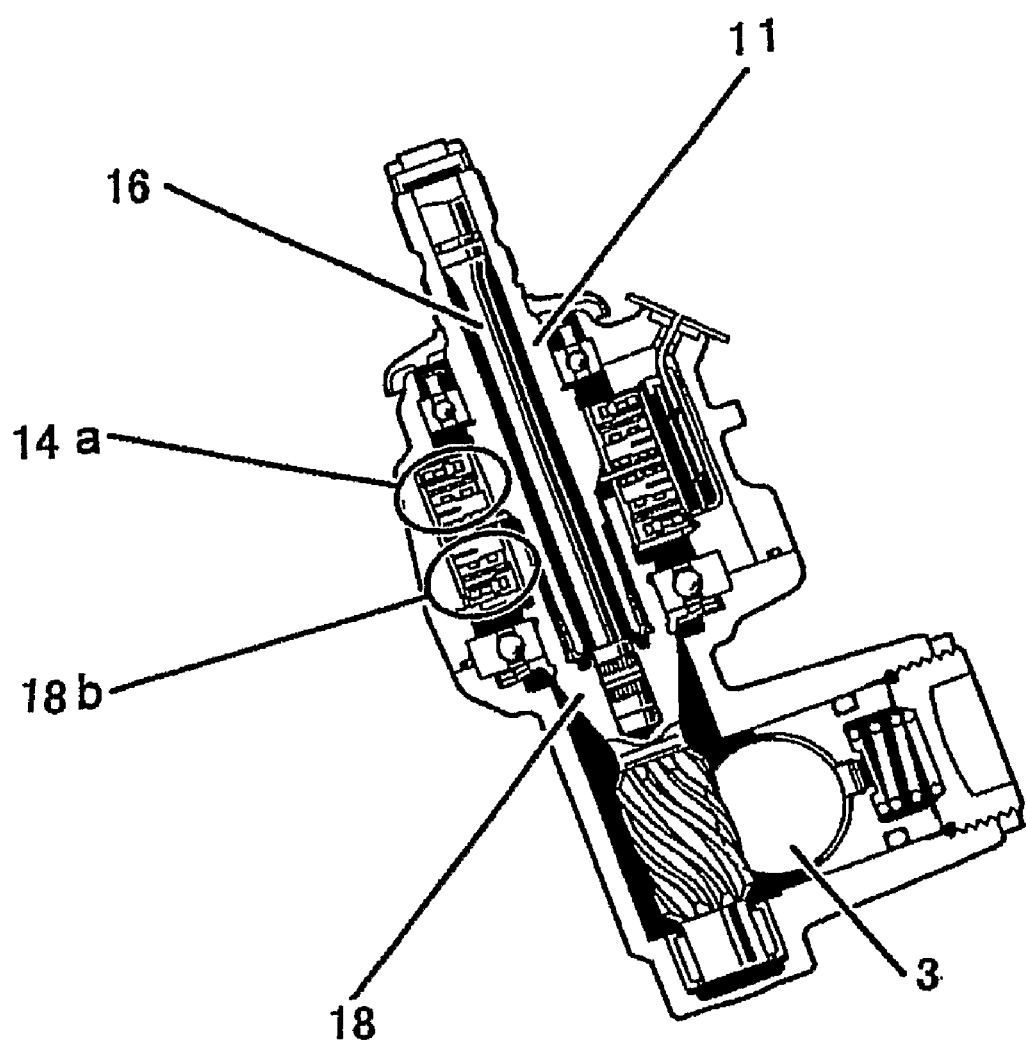
FIG. 2 is a sectional view of the power steering system 1 around a rack and pinion engagement portion thereof.

FIG. 2 shows a section of the power steering system 1 around the rack and pinion engagement portion thereof. The lower end of the steering shaft 11 is connected to a pinion shaft (output shaft) 18 via a torsion bar 16. The rotation of the steering shaft 11 and the rotation of the pinion shaft 18 are linked by the rotation of the torsion bar 16 that involves a twist. Specifically, when the steering shaft 11 rotates, the torsion bar 16 is twisted, which causes a corresponding, rotational angle difference between the steering shaft 11 and the pinion shaft 18 temporarily.

The steering shaft 11 and the pinion shaft 18 are provided with a pair of rotational angle sensors 14a and 18b, which detect the rotational angles of the steering shaft 11 and the pinion shaft 18, respectively. The rotational angle sensors 14a and 18b may be rotational angle sensors using resolver sensors, or rotational angle sensors using Hall elements (Hall IC sensors using the change in magnetic flux). The steering torque applied by the driver, that is, the steering torque applied to the steering shaft 11 is calculated from the difference between the angles detected by the two rotational angle sensors 14a and 18b. In this way, the rotational angle sensors 14a and 18b constitute a torque sensor in which the two sensors 14a and 18b cooperate, and which detects the steering torque applied to the steering shaft 11.

Figure 3:
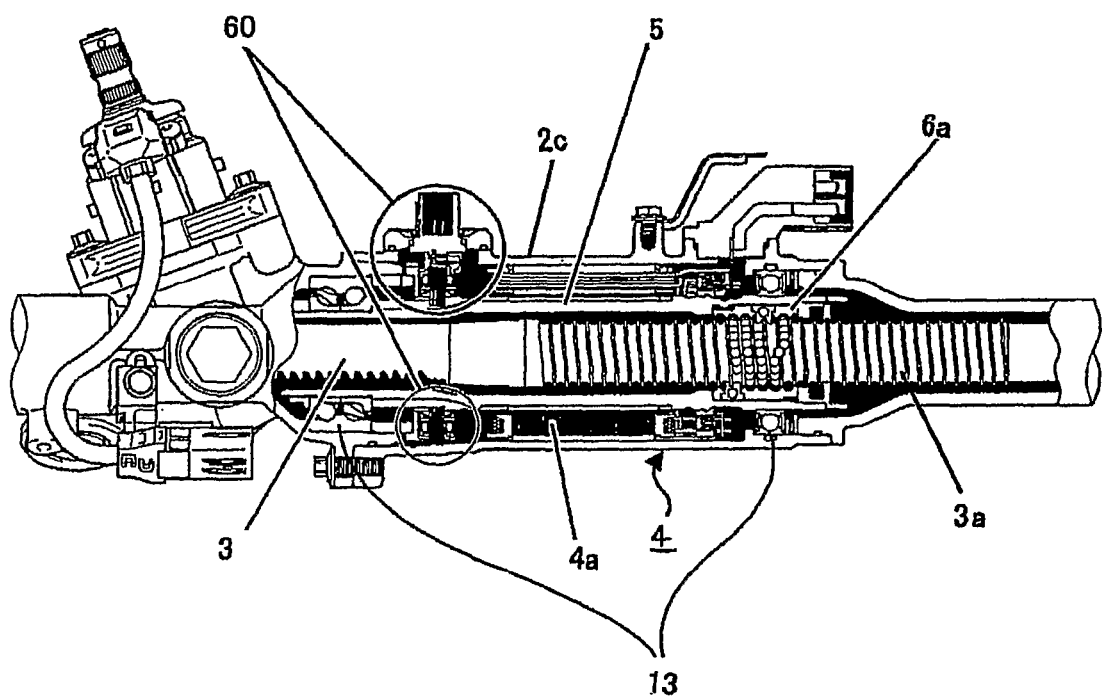
FIG. 3 is a sectional view of the power steering system 1 around an assist motor.

FIG. 3 shows a section of the power steering system 1 around the assist motor 4. The assist motor 4 includes: the stator 4a fixed to the main housing 2c of the gear box; and the cylindrical rotor 5. The rotor 5 has a magnetic portion, and is supported by the main housing 2c via the plurality of bearings 13 relatively rotatably but relatively immovably in the axial direction. A shaft (male screw portion) 3a is formed in part of the rack bar 3, and is relatively rotatably engaged with the ball screw nut (female screw portion) 6a with a plurality of balls interposed therebetween. The ball screw nut 6a is coaxially and relatively unrotatably attached to the rotor 5. When the rotor 5 rotates, the ball screw nut 6a rotates, which causes the shaft 3a to move in the axial direction. In this way, the rotation of the assist motor 4 causes the rack bar 3 to move linearly, thereby boosting the steering torque applied by the driver.

Figure 4:
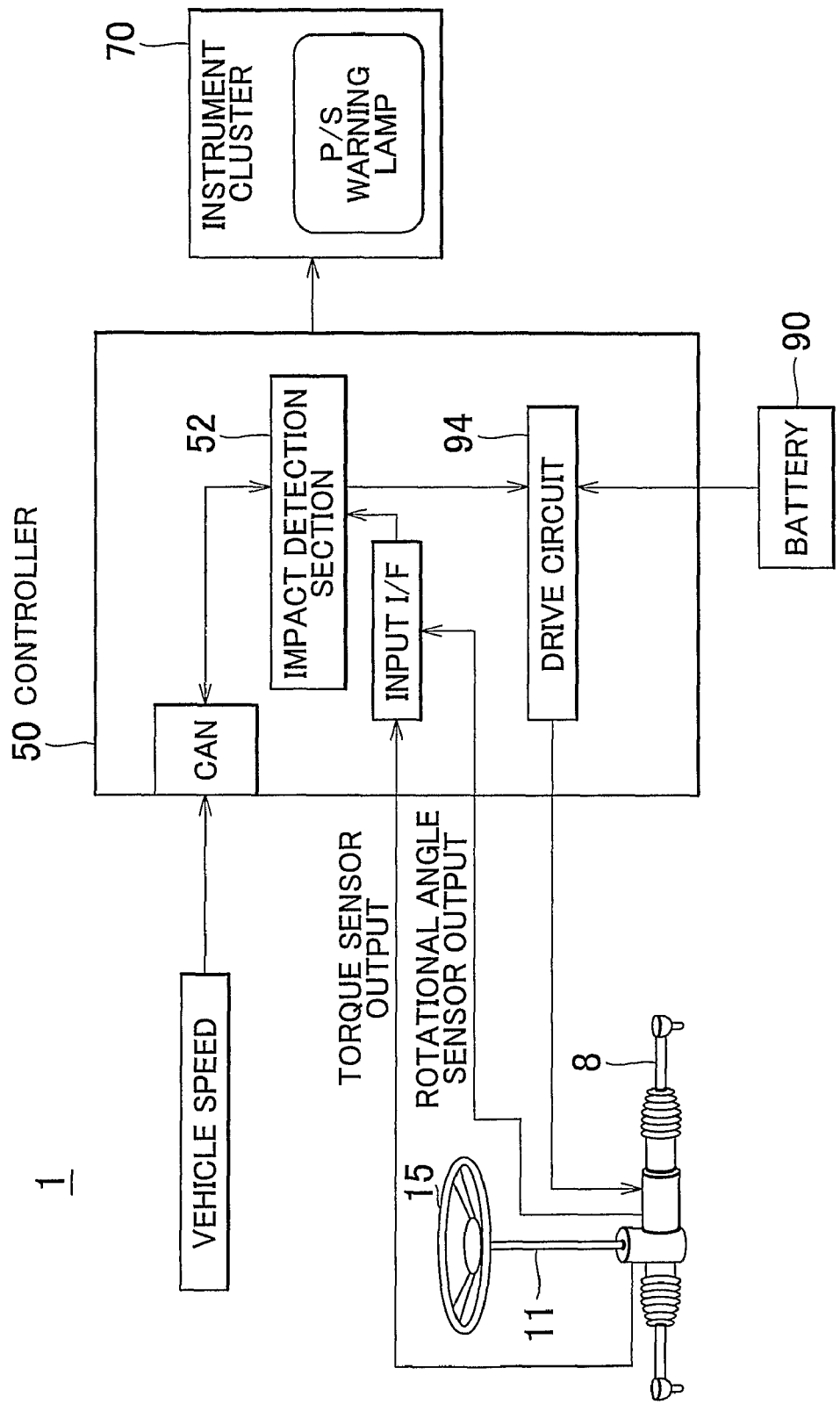
FIG. 4 is a system configuration diagram schematically showing an embodiment of the power steering system 1 according to the present invention.

As shown in FIG. 4, the assist motor 4 is a brushless DC motor, and is connected to a battery 90, which is a DC power supply, with a drive circuit 94 inserted therebetween. The assisting electric-current value of the assist motor 4 is feedback-controlled by the controller 50, in response to the output signal from a rotational angle sensor 60 for detecting the rotational angle of the rotor 5.

As in the case of the rotational angle sensors 14a and 18b, the rotational angle sensor 60 may be a rotational angle sensor using a resolver sensor, or a rotational angle sensor using a Hall element. If the resolver sensor is used, for example, an R/D (resolver/digital) converter converts the analog bi-phase signal generated by the rotation of the rotor 5 into a digital signal by calculating the rotational angle or the rotational speed (angular speed) of the rotor 5 from the bi-phase signal, and then outputs the digital signal to the controller 50.

The power steering system 1 is fastened to a suspension member with bushings interposed therebetween. The main gear portion (see FIGS. 2 and 3) of the power steering system 1 is typically disposed in an engine compartment, and, around the main gear portion, peripheral components, such as the engine and the transmission, are arranged. Accordingly, when a large impulsive force as exerted at the time of collision is exerted on a vehicle, the peripheral components can hit the power steering system 1, which can impair the functions of the main gear portion.

As a measure against the problem, there is an approach in which acceleration sensors for detecting collision (a floor sensor placed in a floor tunnel, or satellite sensors placed in the right and left front portions of a vehicle) are used, and, if an impulse value equal to or greater than a predetermined reference value that can cause a peripheral component to hit the power steering system 1 is detected, the operation of the power steering system 1 is uniformly restricted. In this approach, however, the value of the impulse applied to the power steering system 1 (in particular, the main gear portion thereof) is not directly detected. For this reason, a problem can arise that, even when the restriction is not necessary, such as when no peripheral component hits the power steering system 1 actually, the operation of the power steering system 1 is restricted.

In contrast, in the present invention, as described in detail below, it is made possible to detect the impact of a peripheral component on the power steering system 1 (in particular, the main gear portion) with high accuracy without any additional sensors by effectively using the rotational angle sensors 60, 14a and 18b that have already been installed to control the assisting operation of the power steering system 1. Specific configurations will be described below with reference to several embodiments.

The first embodiment relates to a case where the rotational angle sensor 60 of the assist motor 4 is effectively used to detect the impact of a peripheral component on the power steering system 1 (in particular, the part thereof around the assist motor).

Figure 5A:
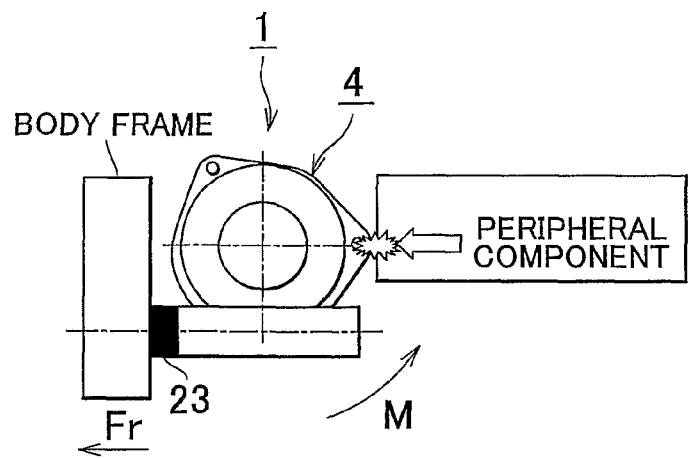
FIG. 5A is a side view schematically showing the impact of a peripheral component on the part of the power steering system 1 around the assist motor.
Figure 5B:
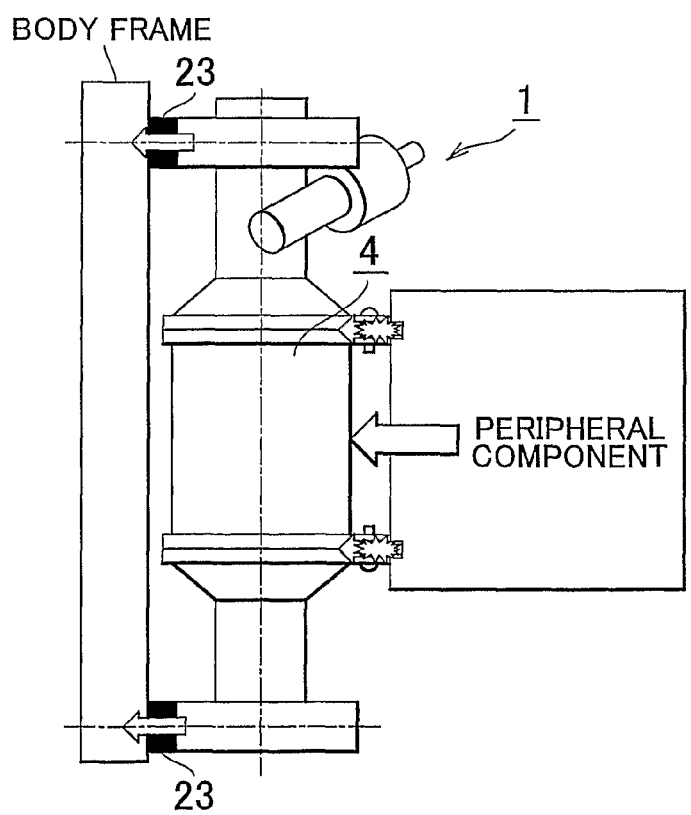
FIG. 5B is a plan view schematically showing the impact of the peripheral component on the part of the power steering system 1 around the assist motor.

FIGS. 5A and 5B are a side view and a plan view, respectively, which schematically show the impact of a peripheral component on the part of the power steering system 1 around the assist motor (see FIG. 3).

In the example shown in FIGS. 5A and 5B, the left direction in FIGS. 5A and 5B is the forward direction of the vehicle, and the peripheral component, such as an engine, is placed at the rear of the gear box of the power steering system 1. The gear box of the power steering system 1 is fastened to a body frame (the suspension member) at two points along the lateral direction of the vehicle with bushings, for example, interposed therebetween. With regard to the example shown in FIGS. 5A and 5B, there is a possibility that, at the time of the vehicle collision (head-on collision), for example, the heavy peripheral component moves forward due to the inertial force, and hits the power steering system 1 from the rear thereof.

When such an impact of the peripheral component on the power steering system 1 occurs, a moment M that causes the suspension member to rotate about the fastening points occurs in the stator 4a of the assist motor 4 (the main housing 2c of the gear box) (see the arrow M in FIG. 5A), and the stator 4a rotates relative to the rotor 5.

Figure 6:
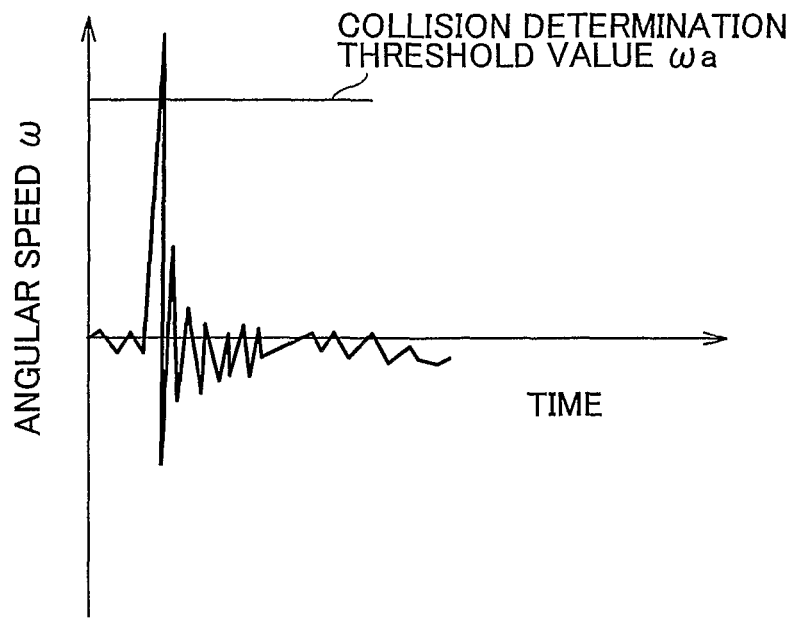
FIG. 6 is a diagram showing an output waveform of an angular speed signal sent from a rotational angle sensor 60 when a peripheral component hits the power steering system 1.

FIG. 6 is a diagram showing a time-series waveform of an angular speed signal ω (a signal ω that represents the angular speed of the rotor 5) sent from the rotational angle sensor 60 when a peripheral component hits the power steering system 1. As shown in FIG. 6, when a peripheral component hits the power steering system 1, the above-described rotation of the stator 4a relative to the rotor 5 causes a large amplitude of the angular speed signal ω from the rotational angle sensor 60 (high angular speed). It should be understood that it is possible to detect the impact of the peripheral component on the power steering system 1 based on the output signal, the angular speed signal ω, from the rotational angle sensor 60.

In this embodiment, when the angular speed ω of the rotor 5 exceeds a predetermined threshold value ωa1 for determining whether an impact has occurred, an impact detection section 52 of the controller 50 (see FIG. 4) determines that the impact of a peripheral component on the power steering system 1 has occurred. The impact determination threshold value ωa1 is appropriately determined or adjusted through calculations or testing, in consideration of the weight of the peripheral component, the distance (in particular, the moment arm length for the moment M) between the center of gravity of the power steering system 1 and the fastening points of the power steering system 1 (the points at which the power steering system 1 is fastened to the suspension member), and the like.

The impact determination threshold value ωa1 may be specified for one rotational direction only. This is because the direction of the rotation of the stator 4a relative to the rotor 5 (the direction of the moment M) at the time of the head-on collision is determined by the positional relationship of the fastening point(s) of the power steering system 1 to the center of gravity thereof.

The impact determination threshold value ωa1 may be variable according to the vehicle speed measured at the time when it is determined that the impact has occurred, or immediately before the time. This is because the peak value of the angular speed ω of the rotor 5 varies according to the impulse force, that is, the inertial force of the peripheral component.

As described above, according to the first embodiment, it is made possible to detect the impact of a peripheral component on the power steering system 1 with high accuracy without any additional sensors by effectively using the rotational angle sensor 60 that has already been installed to control the assisting operation.

In the first embodiment, if it is determined that the impact of a peripheral component on the power steering system 1 has occurred, the impact detection section 52 displays a warning on an instrument cluster 70 (see FIG. 4), for example. Alternatively, the warning may be acoustically output via a speaker or the like to prompt the driver to have the vehicle inspected or repaired, for example. Alternatively, the power supply to the power steering system 1 may be cut off (the connection between the assist motor 4 and the battery 90 may be cut off by a relay, for example). These measures may be variable according to the angular speed ω of the rotor 5. For example, a warning is issued when the angular speed ω of the rotor 5 is near the impact determination threshold value ωa1, whereas the power supply to the power steering system 1 is cut off when the angular speed ω of the rotor 5 becomes very high.

A second embodiment relates to a case where the rotational angle sensor 60 of the assist motor 4 is effectively used to detect the impact of a peripheral component on the power steering system 1 (in particular, the part thereof around the assist motor), paying appropriate attention to the possibility that the angular speed of the rotor 5 varies due to the backward input from the wheels.

When the backward input from the wheels is applied, the linear motion of the rack bar 3 (the movement of the shaft 3a in the axial direction) is caused, which in turn causes the rotor 5 to rotate through the medium of the ball screw nut 6a. Also in this case, the angular speed of the rotor 5 varies. Accordingly, it is necessary to avoid erroneously determining that the impact of a peripheral component on the power steering system 1 has occurred, in response to such variation of the angular speed.

Figure 7:
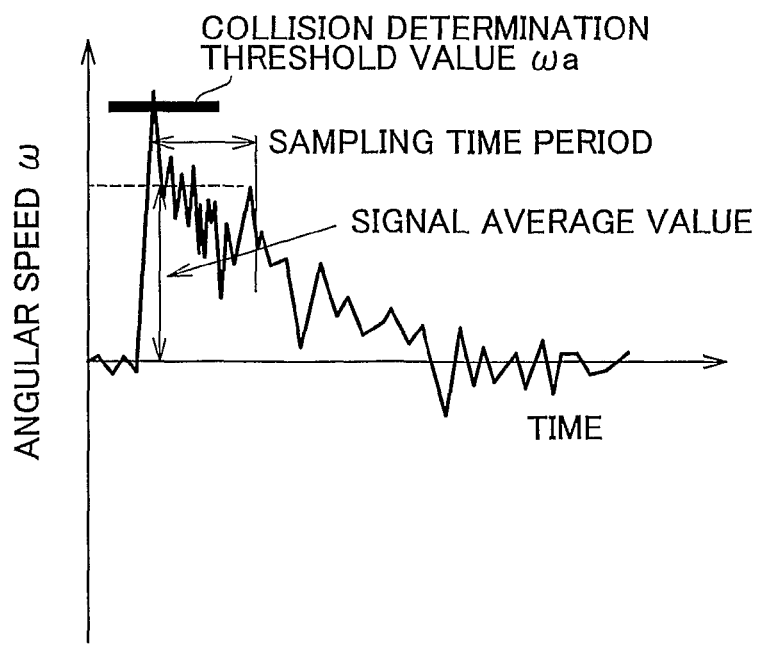
FIG. 7 is a diagram showing a time-series waveform of a angular speed signal ω (the signal ω representing the angular speed of the rotor 5) sent from the rotational angle sensor 60 when a backward input is caused.

FIG. 7 is a diagram showing a time-series waveform of the angular speed signal ω (the signal ω representing the angular speed of the rotor 5) sent from the rotational angle sensor 60 when the backward input is caused. As shown in FIG. 7, when the backward input is applied from the wheels to the power steering system 1, the rack bar 3 vibrates while moving in one direction corresponding to the direction of the backward input. Accordingly, with regard to the state of the change in the angular speed of the rotor 5 made when the backward input is caused, as shown in FIG. 7, the period of time during which the vibration is continued at high angular speeds is long, as compared to the impulsive vibration pattern exhibited at the time of the impact of the peripheral component on the power steering system 1.

In the second embodiment, the controller 50 calculates the average value of the angular speed signal ω (angular speed ω) from the sampling data accumulated during a predetermined sampling time period from when the angular speed ω of the rotor 5 exceeds the predetermined impact determination threshold value ωa1. If the calculated average value is less than a predetermined threshold value Thr1, it is determined that the impact of a peripheral component on the power steering system 1 has occurred. On the other hand, if the calculated average value is greater than the predetermined threshold value, it is determined that the variation of the angular speed of the rotor 5 has been caused by the backward input from the wheels. It should be noted that the predetermined threshold value Thr1 is appropriately determined or adjusted through calculations or testing. The impact determination threshold value ωa1 may be determined in a way similar to that used in the above-described first embodiment.

As described above, according to the second embodiment, it is made possible to detect the variation of the angular speed of the rotor 5 caused by the impact of a peripheral component on the power steering system 1 with high accuracy, wherein the variation of the angular speed of the rotor 5 caused by the backward input from the wheels is discriminated therefrom. In addition, because the determination is triggered when the angular speed ω of the rotor 5 exceeds the predetermined impact determination threshold value ωa1, it is possible to reduce the load of making the determination.

In the second embodiment, instead of the average value of the angular speed signal ω (angular speed ω), the time integral of the angular speed signal ω may be used. In this case, the impact detection section 52 integrates the angular speed signal ω over a predetermined integration time (which may be the same as the predetermined sampling time period, for example), which is triggered when the angular speed ω of the rotor 5 exceeds the predetermined impact determination threshold value ωa1. In this case, if the integral value does not exceed a predetermined threshold value, the impact detection section 52 determines that the impact of a peripheral component on the power steering system 1 has occurred; if the integral value exceeds the predetermined threshold value, the impact detection section 52 determines that the variation of the angular speed of the rotor 5 has been caused by the backward input from the wheels. This mode also makes it possible to detect the variation of the angular speed of the rotor 5 caused by the impact of the peripheral component on the power steering system 1 with high accuracy, wherein the variation of the angular speed of the rotor 5 caused by the backward input from the wheels is discriminated therefrom. In addition, because the determination is triggered when the angular speed ω of the rotor 5 exceeds the predetermined impact determination threshold value ωa1, it is possible to reduce the load of making the determination.

A third embodiment relates to a case where the rotational angle sensor 60 of the assist motor 4 is effectively used to detect the impact of a peripheral component on the power steering system 1 (in particular, the part thereof around the assist motor), paying appropriate attention to the possibility that the angular speed of the rotor 5 varies due to the backward input from the wheels as in the case of the second embodiment.

As described above, when the backward input from the wheels is applied, the linear motion of the rack bar 3 (the movement of the shaft 3a in the axial direction) is caused, which in turn causes the variation of the angular speed of the rotor 5. The variation of the angular speed of the rotor 5 includes the vibration due to impulsive force. When a peripheral component hits the power steering system 1, the angular speed signal ω from the rotational angle sensor 60 should include a large proportion of the vibration components with frequencies corresponding to the resonance frequencies of the structure of the power steering system 1.

Figure 8A:
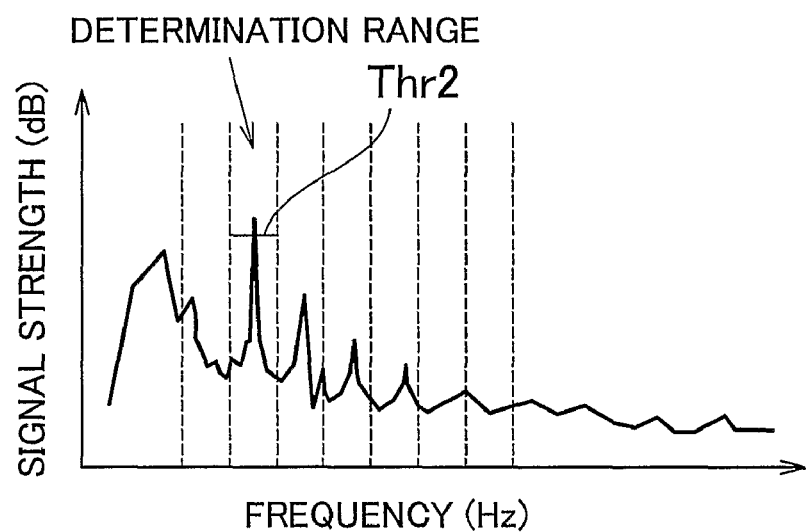
FIG. 8A is a diagram showing a frequency spectrum of an angular speed signal ω generated when a peripheral component hits the power steering system 1.
Figure 8B:
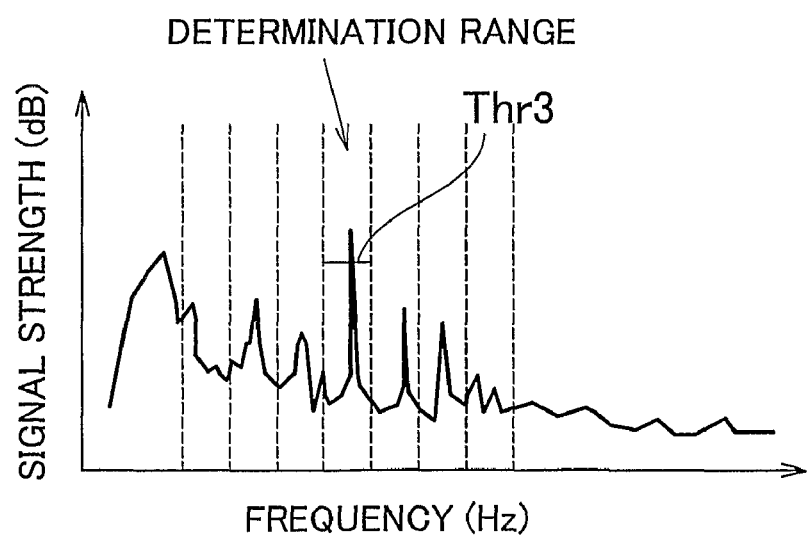
FIG. 8B is a diagram showing a frequency spectrum of an angular speed signal ω generated when the backward input is applied from the wheels.

FIG. 8A is a diagram showing a frequency spectrum of the angular speed signal ω generated when a peripheral component hits the power steering system 1. FIG. 8B is a diagram showing a frequency spectrum of the angular speed signal ω generated when the backward input from the wheels is applied. As shown in FIGS. 8A and 8B, in each case, the angular speed signal includes a large proportion of the frequency components with different frequencies.

In this embodiment, the impact detection section 52 of the controller 50 performs an FFT (Fast Fourier Transform) on the sampling data accumulated during a predetermined sampling time period from when the angular speed ω of the rotor 5 exceeds the predetermined impact determination threshold value ωa1. If the strength (power spectrum) (dB) of the angular speed signal ω within a specific first frequency band exceeds a predetermined threshold value Thr2, it is determined that the impact of a peripheral component on the power steering system 1 has occurred. The specific first frequency band may be determined with the resonance frequency of the power steering system 1 centered. The resonance frequency of the power steering system 1 may be derived through calculations or experiments (such as the transient response test).

If, after the FFT, the strength of the angular speed signal ω within a specific second frequency band exceeds a predetermined threshold value Thr3, the impact detection section 52 determines that the variation of the angular speed of the rotor 5 has been caused by the backward input from the wheels. The specific second frequency band and the predetermined threshold value Thr3 may be determined or adjusted through calculations or experiments.

According to the third embodiment, it is made possible to detect the variation of the angular speed of the rotor 5 caused by the impact of the peripheral component on the power steering system 1 with high accuracy, wherein the variation of the angular speed of the rotor 5 caused by the backward input from the wheels is discriminated therefrom. In addition, because the determination is triggered when the angular speed ω of the rotor 5 exceeds the predetermined impact determination threshold value ωa1, it is possible to reduce the load of making the determination.

In the third embodiment, from the same viewpoint, the frequency component within the first frequency band of the angular speed signal ω sampled during a predetermined sampling time period may be extracted to determine whether the peak of the extracted angular speed signal ω exceeds a predetermined impact determination threshold value. If the peak of the extracted angular speed signal ω exceeds the impact determination threshold value, the impact detection section 52 determines that the impact of a peripheral component on the power steering system 1 has occurred.

Similarly, the frequency component within the second frequency band of the angular speed signal ω sampled during a predetermined sampling time period may be extracted to determine whether the peak of the extracted angular speed signal ω exceeds a predetermined impact determination threshold value. If the peak of the extracted angular speed signal ω exceeds the impact determination threshold value, the impact detection section 52 determines that the variation of the angular speed of the rotor 5 has been caused by the backward input from the wheels.

The third embodiment does not conflict with the second embodiment. Accordingly, by using these discrimination methods in combination (by ANDing or ORing them, for example), it is possible to discriminate the variation of the angular speed of the rotor 5 caused by the impact of a peripheral component on the power steering system 1 from the variation of the angular speed of the rotor 5 caused by the backward input from the wheels more accurately.

The fourth embodiment relates to a case where the rotational angle sensor(s) 14a and/or 18b (at least one of them) constituting a torque sensor is effectively used to detect the impact of a peripheral component on the power steering system 1 (in particular, the part thereof around the torsion bar). As will become apparent from the following description, the fourth and fifth embodiments described below are not limited to the electric power steering system. There is no limitation on the steering assist means, as long as it has a torsion bar and a torque sensor including a rotational angle sensor. The fourth and fifth embodiments can be applied to hydraulic power steering systems, for example.

Figure 9A:
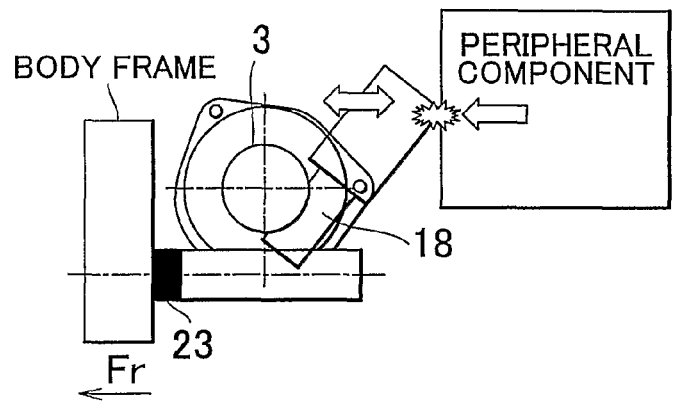
FIG. 9A is a side view schematically showing the impact of a peripheral component on the part of the power steering system 1 around a torsion bar (see FIG. 2)
Figure 9B:
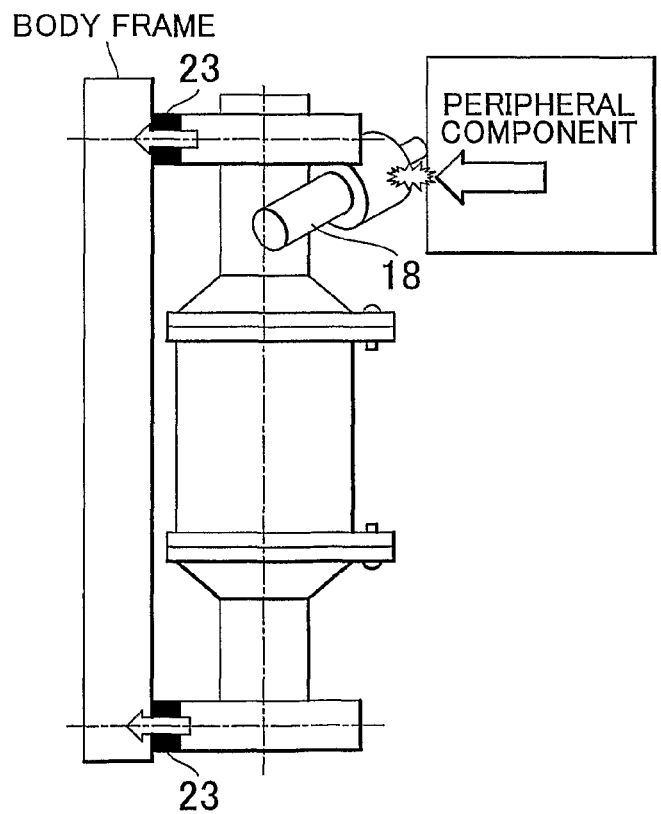
FIG. 9B is a plan view schematically showing the impact of the peripheral component on the part of the power steering system 1 around the torsion bar (see FIG. 2)

FIGS. 9A and 9B are a side view and a plan view, respectively, which schematically show the impact of a peripheral component on the part of the power steering system 1 around the torsion bar (see FIG. 2).

In the example shown in FIGS. 9A and 9B, the left direction in FIGS. 9A and 9B is the forward direction of the vehicle, and the peripheral component, such as an engine, is placed at the rear of the gear box of the power steering system 1. The gear box of the power steering system 1 is fastened to the suspension member at two points along the lateral direction of the vehicle with bushings interposed therebetween, for example. With regard to the example shown in FIGS. 9A and 9B, there is a possibility that, at the time of the vehicle collision (head-on collision), for example, the heavy peripheral component moves forward due to the inertial force, and hits the power steering system 1 from the rear thereof. When such an impact of the peripheral component on the power steering system 1 occurs, both of the steering shaft 11 and the pinion shaft 18 vibrate.

Figure 10:
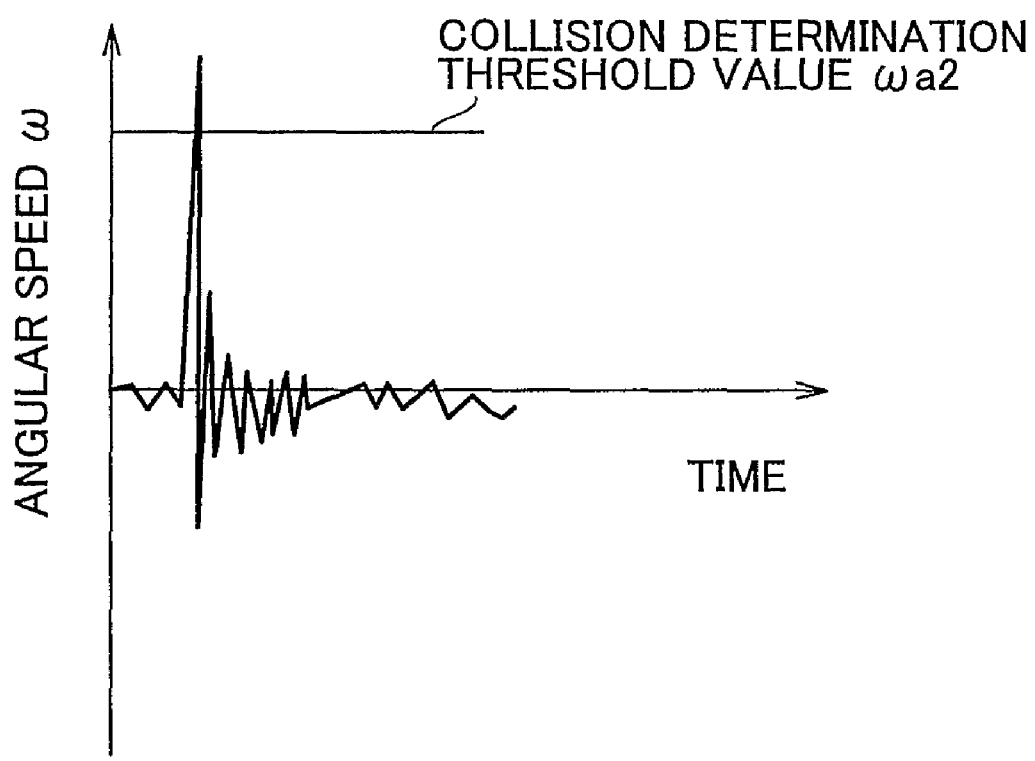
FIG. 10 is a diagram showing an output waveform of an angular speed signal sent from a rotational angle sensor 14$a$ when a peripheral component hits the power steering system 1.

FIG. 10 is a diagram showing a time-series waveform of an angular speed signal ω (a signal ω that represents the angular speed of the steering shaft 11) sent from the rotational angle sensor 14a (or 18b; this applies hereinafter) when the peripheral component hits the power steering system 1. As shown in FIG. 10, when the peripheral component hits the power steering system 1, the above-described vibration of the steering shaft 11 causes a large amplitude of the angular speed signal ω from the rotational angle sensor 14a (high angular speed). It should be understood that it is possible to detect the impact of the peripheral component on the power steering system 1 based on the output signal, the angular speed signal ω, from the rotational angle sensor 14a.

In the fourth embodiment, when the angular speed ω of the steering shaft 11 (or the pinion shaft 18; this applies hereinafter) exceeds a predetermined threshold value ωa2, the impact detection section 52 of the controller 50 determines that the impact of a peripheral component on the power steering system 1 has occurred. The impact determination threshold value ωa2 is appropriately determined or adjusted through calculations or testing in consideration of the weight of the peripheral component, the positional relation ship between the peripheral component and the power steering system 1, the vibration characteristics of the steering shaft 11 and the like.

The impact determination threshold value ωa2 may be variable according to the vehicle speed measured at the time when it is determined that the impact has occurred, or immediately before the time. This is because the peak value of the angular speed ω of the steering shaft 11 varies according to the impulse force, that is, the inertial force of the peripheral component.

As described above, according to the fourth embodiment, it is made possible to detect the impact of a peripheral component on the power steering system 1 with high accuracy without any additional sensors by effectively using the rotational angle sensor 14a that has already been installed to control the assisting operation.

In the fourth embodiment, if it is determined that an impact of a peripheral component on the power steering system 1 has occurred, the impact detection section 52 acoustically or visually outputs a warning or the like to prompt the driver to have the vehicle inspected or repaired, for example. Alternatively, the power supply to the power steering system 1 may be cut off (the connection between the assist motor 4 and the battery 90 may be cut off by a relay or the like, for example). These measures may be variable according to the angular speed ω of the rotational angle sensor 14a. For example, a warning is issued when the angular speed ω of the rotational angle sensor 14a is near the impact determination threshold value ωa2, whereas the power supply to the power steering system 1 is cut off when the angular speed ω of the rotational angle sensor 14a becomes very high.

The fifth embodiment relates to a case where the rotational angle sensors 14a and 18b are effectively used to detect the impact of a peripheral component on the power steering system 1 (in particular, the part thereof around the torsion bar), paying appropriate attention to the possibility that the angular speed of the rotor 5 varies due to the backward input from the wheels.

When the backward input from the wheels is applied, the linear motion of the rack bar 3 is caused, which in turn causes the pinion shaft 18 to rotate. Then, the steering shaft 11 is urged to rotate through the medium of the torsion bar 16. Also in this case, the angular speed of the pinion shaft 18 (or the steering shaft 11) varies. Accordingly, it is necessary to avoid erroneously determining that the impact of a peripheral component on the power steering system 1 has occurred, in response to such variation of the angular speed.

When the backward input is caused, the pinion shaft 18 rotates, and the steering shaft 11 is urged to rotate through the medium of the torsion bar 16. For this reason, a phase difference between the angular speed signal ω from the rotational angle sensor 14a and the angular speed signal ω from the rotational angle sensor 18b should occur. Specifically, the phase of the angular speed signal ω from the rotational angle sensor 18b, which represents the angular speed of the pinion shaft 18, should be leading relative to the phase of the angular speed signal ω from the rotational angle sensor 18b, which represents the angular speed of the steering shaft 11.

Figure 11A:
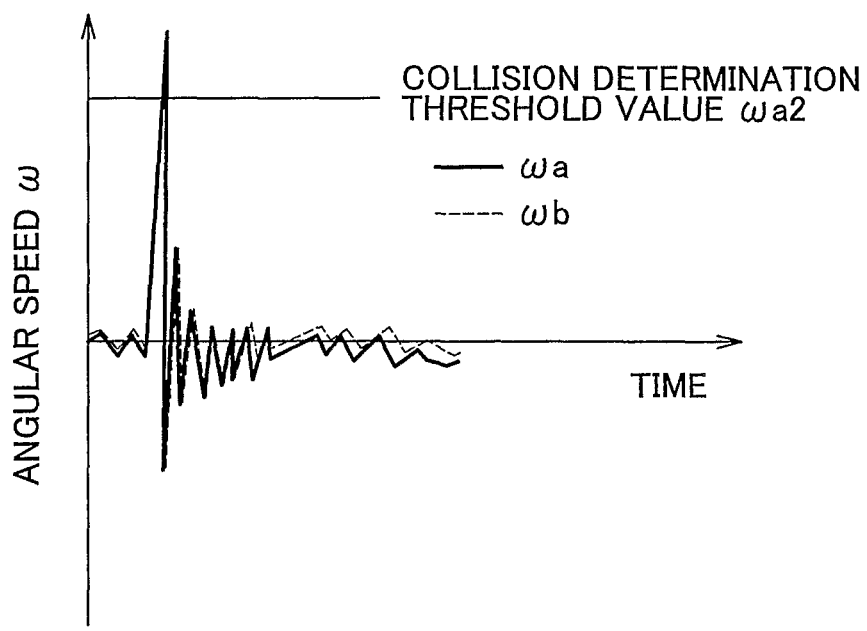
FIG. 11A is a diagram showing the output waveforms of the angular speed signals ω$a$ and ω$b$ sent from the rotational angle sensors 14$a$ and 18$b$, respectively, when a peripheral component hits the power steering system 1.
Figure 11B:
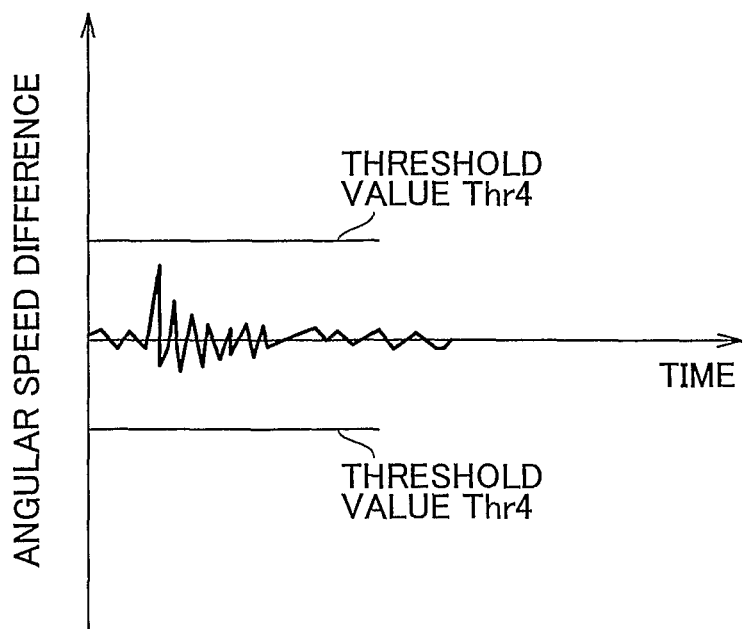
FIG. 11B is a diagram showing an output waveform of a signal representing the difference between the angular speed signals ω$a$ and ω$b$.

On the other hand, when a peripheral component hits the power steering system 1, as shown in FIG. 11A, a large amplitude (high angular speed) occurs in each of an angular speed signal ωa from the rotational angle sensor 14a and an angular speed signal ωb from the rotational angle sensor 18b (the solid line and the broken line, respectively), whereas, as shown in FIG. 11B, no large amplitude (high angular speed) occurs in the signal (ωa-ωb) representing the difference therebetween. It is conceivable that this is because, when a peripheral component hits the power steering system 1, the pinion shaft 18 and the steering shaft 11 vibrate in phase without the intervention of the torsion of the torsion bar 16.

Accordingly, in the fifth embodiment, when both of a peak of the angular speed signal ωa from the rotational angle sensor 14a and a peak of the angular speed signal ωb from the rotational angle sensor 18b exceed the predetermined collision determination threshold value ωa2, and the absolute value of the difference signal between the angular speed signals ωa and ωb, |ωa-ωb|, does not exceed a predetermined threshold value Thr4 (see FIG. 11B), the impact detection section 52 of the controller 50 determines that an impact of a peripheral component on the power steering system 1 has occurred. When one of the peaks of the angular speed signals ωa and ωb exceeds the predetermined collision determination threshold value ωa2, and the absolute value of the difference signal, |ωa-ωb|, does not exceed the predetermined threshold value Thr4, the impact detection section 52 determines that an impact of a peripheral component on the power steering system 1 has occurred.

On the other hand, even if one of the peak of the angular speed signal ωa from the rotational angle sensor 14a and the peak of the angular speed signal ωb from the rotational angle sensor 18b exceeds the predetermined collision determination threshold value ωa2, when the absolute value of the difference signal, |ωa-ωb|, exceeds the predetermined threshold value Thr4, it is determined that the variation of the angular speed of the rotor 5 has been caused by the backward input from the wheels.

As described above, according to the fifth embodiment, it is made possible to detect the variation of the angular speed of the rotor 5 caused by the impact of the peripheral component on the power steering system 1 with high accuracy, wherein the variation of the angular speed of the rotor 5 caused by the backward input from the wheels is discriminated therefrom.

In the fifth embodiment, similar discrimination can be carried out by using the difference signal (the signal representing the difference between the rotational angles) between the rotational angle signal from the rotational angle sensor 14a and the rotational angle signal from the rotational angle sensor 18b, instead of the difference signal (the signal representing the difference between the angular speed) between the angular speed signal $\omega a$ from the rotational angle sensor 14a and the angular speed signal $\omega b$ from the rotational angle sensor 18b. For example, when both of a peak of the angular speed signal $\omega a$ from the rotational angle sensor 14a and a peak of the angular speed signal $\omega b$ from the rotational angle sensor 18b exceed the predetermined collision determination threshold value $\omega a2$, and the absolute value of the difference between the rotational angles does not exceed a predetermined threshold value, it is determined that an impact of a peripheral component on the power steering system 1 has occurred. On the other hand, even if both of a peak of the angular speed signal $\omega a$ and a peak of the angular speed signal $\omega b$ exceed the predetermined collision determination threshold value $\omega a2$, when the absolute value of the difference between the rotational angles exceeds the predetermined threshold value, it is determined that the variation of the angular speed of the rotor 5 has been caused by the backward input from the wheels.

The fifth embodiment can be applied to the first embodiment, with the concept of the second or third embodiment adopted. In this case, when the angular speed $\omega$ of the rotor 5 exceeds the predetermined collision determination threshold value $\omega a1$, and the angular speed difference or the rotational angle difference does not exceed the predetermined threshold value, the impact detection section 52 determines that an impact of a peripheral component on the power steering system 1 has occurred. On the other hand, even if the angular speed $\omega$ of the rotor 5 exceeds the predetermined collision determination threshold value $\omega a1$, when the angular speed difference or the rotational angle difference exceeds the predetermined threshold value, the impact detection section 52 determines that the variation of the angular speed of the rotor 5 has been caused by the backward input from the wheels.

Even if a torque sensor using another sensing method is used (the type of torque sensor as disclosed in Japanese Patent Application Publication No. 2003-237597, for example), it is possible to realize similar determination by using the steering torque (or the torsional torque of the torsion bar) that is detected by the torque sensor, instead of the difference signal between the angular speed signal $\omega a$ from the rotational angle sensor 14a and the angular speed signal $\omega b$ from the rotational angle sensor 18b. For example, when the angular speed $\omega$ of the rotor 5 exceeds the predetermined collision determination threshold value $\omega a1$, and the torque detected by the torque sensor does not exceed the predetermined threshold value, it is determined that an impact of a peripheral component on the power steering system 1 has occurred. On the other hand, even if the angular speed $\omega$ of the rotor 5 exceeds the predetermined collision determination threshold value $\omega a1$, when the torque detected by the torque sensor exceeds the predetermined threshold value, it is determined that the variation of the angular speed of the rotor 5 has been caused by the backward input from the wheels.

Although preferable embodiments of the present invention have been described in detail above, the present invention is not limited to the above-described first to fifth embodiments. Various modifications and substitutions can be made to the above embodiments without departing from the scope of the present invention.

For example, although the above-described embodiments relate to the power steering system 1 using rack and pinion system, the present invention can be applied to a power steering system using another motion conversion mechanism (a ball-nut mechanism, for example).

In the above description, the components relating to the assist mechanism are mainly explained. However, the power steering system 1 may be provided with other functions and mechanisms (a variable gear ratio mechanism, for example).

In the above-described first to fifth embodiments, the peripheral component, such as the engine, is placed at the rear of the gear box of the power steering system 1. However, the present invention can be applied to a power steering system in which the peripheral component, such as the engine, is placed in front of the gear box of the power steering system 1. This is because, also in this case, a peripheral component, which will move forward at the time of collision of the vehicle, can be at the rear of the power steering system 1, and, at the time of a rear impact, the peripheral component, such as the engine, can hit the power steering system 1 from the front thereof.

In the above description, the power steering system is constructed so that the assist motor 4 assists the rack bar 3 to move in the axial direction. However, the present invention can be applied to a power steering system in which the assist motor assists the pinion shaft 18 to rotate.

Figure 12A:
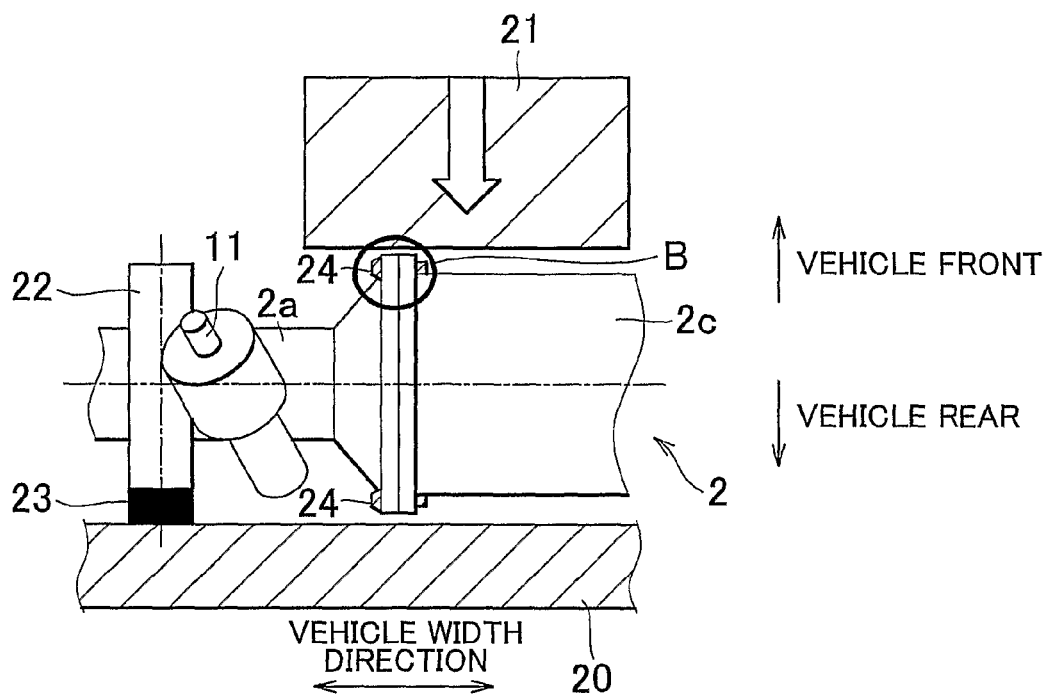
FIG. 12A is a partially enlarged view of the portion A shown in FIG. 1, viewed from above the vehicle, schematically showing a main part of the power steering system.

FIG. 12A is a partially enlarged view of the portion A shown in FIG. 1, viewed from above the vehicle, schematically showing a main part of the power steering system 1.

In the engine room in the forward part of the vehicle, the rack housing 2 is disposed between a suspension member 20 extending in the vehicle width direction and a front member 21, such as an engine member (an engine assembly). The first rack housing 2a and the second rack housing 2b are connected to the suspension member 20 or the like via EPS mounts 22 and mount bushings 23, whereby the rack housing 2 is supported by the vehicle body.

As described above, the first rack housing 2a and the main housing 2c are fastened to each other via bolts 24. A plurality of bolt holes are made in each of a flange portion of the first rack housing 2a and a flange portion of the second rack housing 2b. The bolts 24 are inserted into the bolt holes, and the inserted bolts 24 are screwed into nuts, whereby the first rack housing 2a and the main housing 2c are fastened to each other.

Figure 12B:
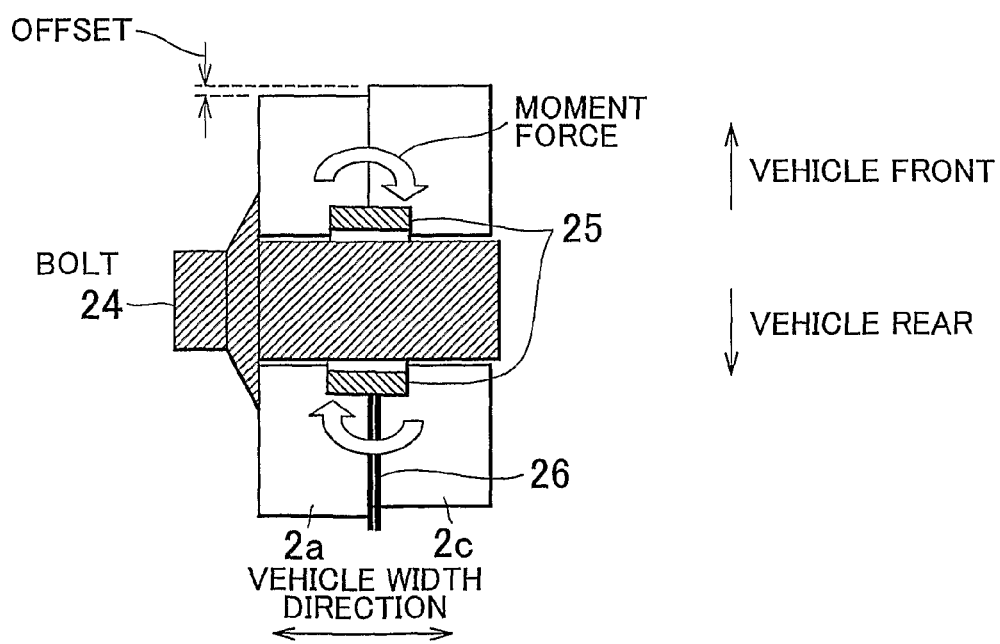
FIG. 12B is a partially enlarged view of the portion B of the power steering system shown in FIG. 12A, showing a section of flange portions of a first rack housing and a main housing.

FIG. 12B is a partially enlarged view of the portion B of the power steering system 1 shown in FIG. 12A, showing a section of the flange portions of the first rack housing 2a and the main housing 2c.

As shown in FIG. 12B, washer-type strain sensors 25 formed in an annular shape are fitted into the bolt holes made in the flange portions of the first rack housing 2a and the main housing 2c, and the bolts 24 are inserted into the strain sensors 25. The flange portion of the first rack housing 2a and the flange portion of the main housing 2c are fastened to each other via the bolts 24 in an offset manner. Thus, the load applied from the front causes a moment force to be exerted on the strain sensors 25, so that it is possible to detect the load applied from the front more surely, and to detect the collision more accurately. The strain sensors 25 send output signals according to the amount of strain.

Figure 13:
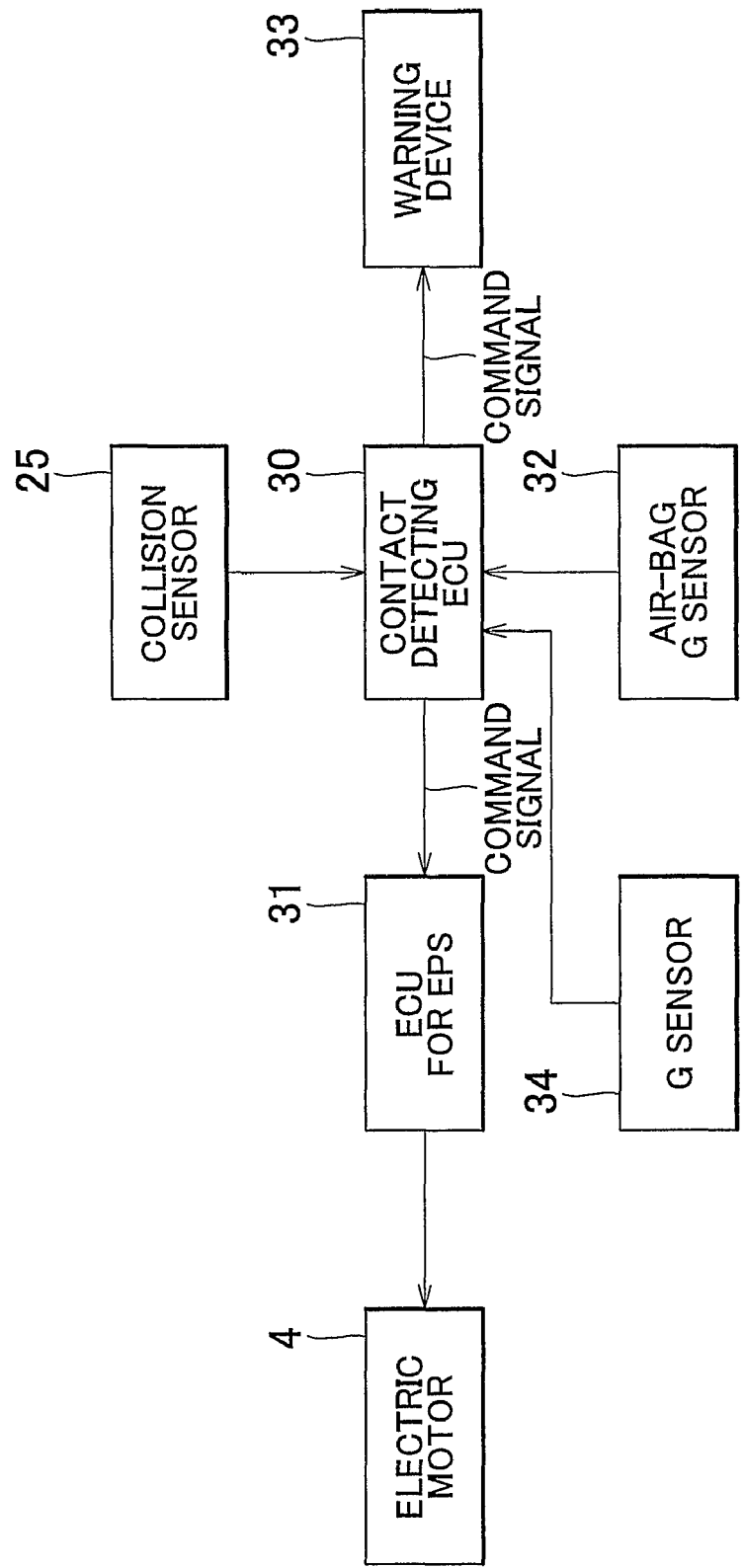
FIG. 13 is a schematic block diagram showing a system configuration of a power steering system of an embodiment of the present invention.

A contact detecting ECU (Electronic Control Unit) 30 for detecting the contact of a member around the rack housing 2 (hereinafter referred to as the peripheral member), such as the suspension member 20 and the front member 21, with the rack housing 2 is connected to the collision sensors 25, such as the above-described strain sensors, via a sensor harness (FIG. 13). The contact detecting ECU 30 detects the contact of the peripheral member with the rack housing 2 based on the output signals from the collision sensors 25.

The contact detecting ECU 30 and an ECU 31 for EPS (Electric Power Steering System) described later are constituted of microcomputers, each including: a CPU (Central Processing Unit) that performs various processes according to control/calculation programs and controls each part of the system; a ROM (Read Only Memory) that stores programs to be executed by the CPU; a readable/writable RAM (Random Access Memory) that stores calculation results and the like; a timer; a counter; and an input/output interface (I/O).

A G sensor 32 for an air bag for detecting the impact on the vehicle (the acceleration) at the time of the vehicle collision is connected to the contact detecting ECU 30. The contact detecting ECU 30 detects the contact of a peripheral member with the rack housing 2 at the time of the vehicle collision, based on the acceleration detected by the air-bag G sensor 32 and the output signals from the collision sensors 25.

For example, the contact detecting ECU 30 determines, from the acceleration detected by the air-bag G sensor 32, whether the collision of the vehicle has occurred, and determines whether a peripheral member has come into contact with the rack housing 2 at the time of the vehicle collision from the output signals from the collision sensors 25, and the threshold value map previously stored in the ROM. In addition, the contact detecting ECU 30 estimates the level of damage to the rack housing (including the inside of the rack housing) 2 caused by the contact of the peripheral member, based on the output signals from the collision sensors 25 and the damage map previously stored in the ROM. With regard to the damage map, the relationship between the output signals from the collision sensors 25 and the damage level of the rack housing 2 is experimentally obtained and stored in the ROM. For example, the damage level of the rack housing 2 increases as the output signals from the collision sensors 25 increase.

The contact detecting ECU 30 determines the response process (applying the assist torque is limited or stopped, or a warning is issued to a user, for example) to be performed after a peripheral member comes into contact with the rack housing 2, based on the estimated damage level, and sends command signals to the ECU 31 for EPS described later, and a warning device 33. A Speaker for giving a voice warning, a warning light for giving a warning by lighting up, flashing or the like, a display device for displaying specific warning messages, or details of abnormality, or the like corresponds to the warning device 33. The ECU 31 for EPS may establish communication connection with an information center via a transmitter-receiver mounted on the vehicle, and notify dealers, which are registered in advance and can repair vehicles, for example, of the details of the failure in the rack housing 2, for example. In this way, it is made possible to quickly deal with the failure.

The ECU 31 for EPS, which controls the steering assist torque for assisting steering, is connected to the contact detecting ECU 30. The ECU 31 for EPS controls the steering assist torque to be applied to the rack shaft 3 by controlling the electric motor 4. Although the contact detecting ECU 30 and the ECU 31 for EPS are separately structured, these may be integrally structured. The ECU 31 for EPS limits or stops applying the steering assist torque to the rack shaft 3, for example, based on the control signal from the contact detecting ECU 30.

Figure 14:
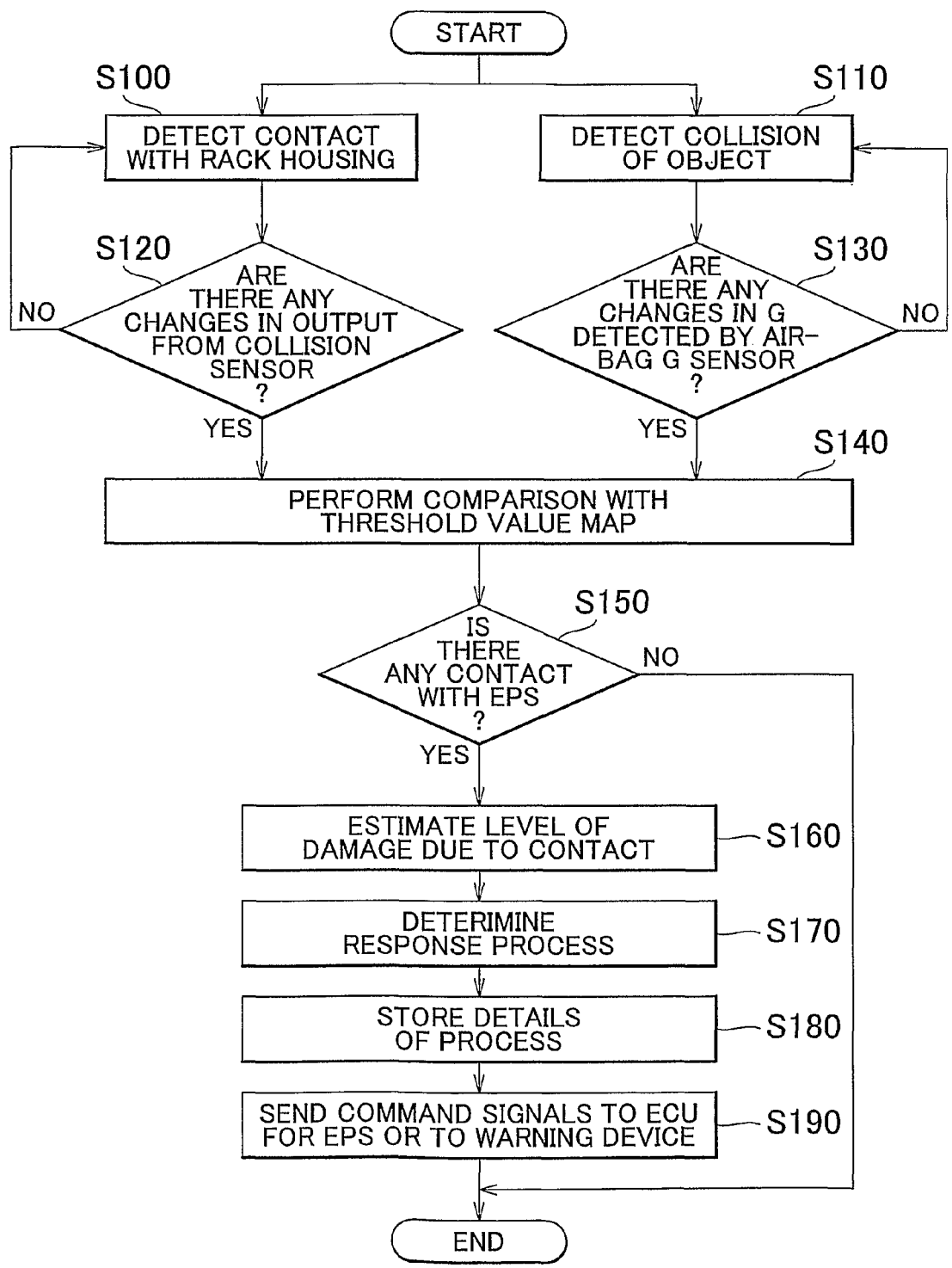
FIG. 14 is a flow chart showing an example of a process flow for controlling the power steering system of the embodiment.

Next, a description will be given of a process flow for controlling the power steering system 1 configured as described above. FIG. 14 is a flow chart showing an example of the process flow for controlling the power steering system 1 of a sixth embodiment. It should be noted that the control process flow shown in FIG. 14 is repeated at predetermined minute periods.

The collision sensors 25 detect the contact of a peripheral member with the rack housing 2 (S100). The air-bag G sensor 32 detects the collision of an object with the vehicle (S110).

The contact detecting ECU 30 determines whether the output signals from the collision sensors 25 have changed (S120), and determines whether the output signal from the air-bag G sensor 32 (acceleration) has changed (S130).

When the contact detecting ECU 30 determines that the output signals from the collision sensors 25 have changed (Yes in step S120), and that the output signal from the air-bag G sensor 32 has changed (Yes in step S130), and, as a result, the contact detecting ECU 30 determines that an object has collided with the vehicle, the contact detecting ECU 30 compares the output signals from the collision sensors 25 with the threshold value map (S140), and the contact detecting ECU 30 determines whether a peripheral member has come into contact with the rack housing 2 at the time of the vehicle collision (S150). By determining from the output signal from the air-bag G sensor 32 whether an object has collided with the vehicle, and determining from the output signals from the collision sensors 25 whether a peripheral member has come into contact with the rack housing 2, it is possible to determine whether a peripheral member has come into contact with the rack housing 2, more accurately.

When it is determined that a peripheral member has come into contact with the rack housing 2 (Yes in step S150), the contact detecting ECU 30 estimates the level of damage to the rack housing 2 due to the contact of the peripheral member, based on the output signals from the collision sensors 25 and the damage map (S160).

In addition, the contact detecting ECU 30 determines the response process to be performed after the contact with the rack housing 2, based on the estimated damage level (S170), and stores the details of the process into the RAM (S180).

The contact detecting ECU 30 sends command signals to the ECU 31 for EPS or the warning device 33 depending on the determined response process (S190).

As described above, in the power steering system 1 of the sixth embodiment, the damage level of the rack housing (including the inside of the rack housing) 2 is estimated based on the output signals from the collision sensors 25 disposed in the rack housing 2. Thus, it is possible to accurately detect the impact on the rack mechanism in the rack housing 2 at the time of the vehicle collision.

The contact detecting ECU 30 determines the response process to be performed after the contact with the rack housing 2, based on the estimated damage level. Accordingly, it is possible to respond to the damage more appropriately.

Although a best mode to carry out the present invention has been described with the use of the sixth embodiment, the present invention is not limited to the sixth embodiment. Various modifications and substitutions can be made to the above-described sixth embodiment without departing from the scope of the present invention.

Figure 15:
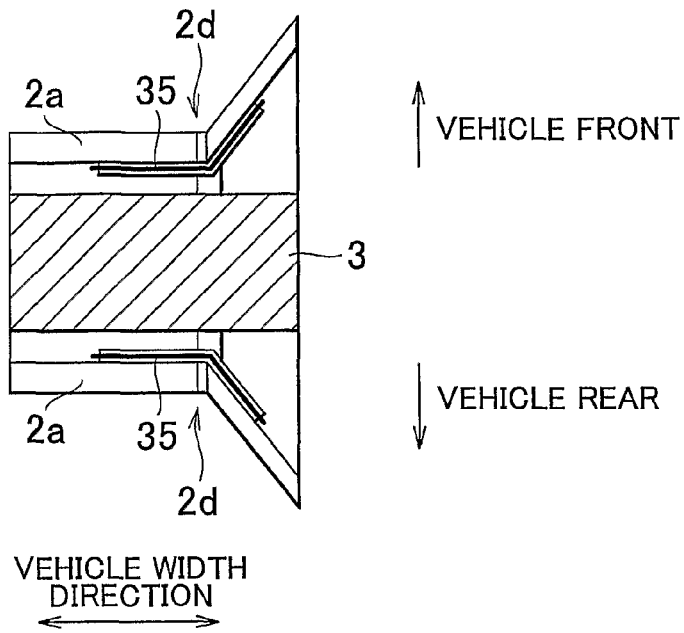
FIG. 15 is a diagram showing an example of the configuration in which a film sensor is disposed on the part of a rack housing where stress concentration occurs.

Although, in the sixth embodiment, the annular, washer-type strain sensors 25, which are fitted into the bolt holes made in the flange portions of the first rack housing 2a and the main housing 2c, are used as the collision sensors 25, the power steering system 1 may have a film sensor 35 disposed on the part 2d of the rack housing 2 where stress concentration occurs (FIG. 15). For example, at the time of the vehicle collision, a peripheral member comes into contact with the flange portions of the first rack housing 2a and the main housing 2c, which causes the stress concentration at the joint part 2d of the first rack housing 2a where the diameter is reduced. The film sensor 35 is disposed along the circumferential direction of the joint part 2d. The film sensor 35 is made of a composite material formed by inserting optical fibers into a resin member, for example. The resistance value of the film sensor 35 varies according to the deformation of the joint part 2d of the first rack housing 2a. It is also preferable that the washer-type strain sensors 25 and the film sensor 35 be used in combination to estimate the damage level of the rack housing 2 more accurately.

Figure 16:
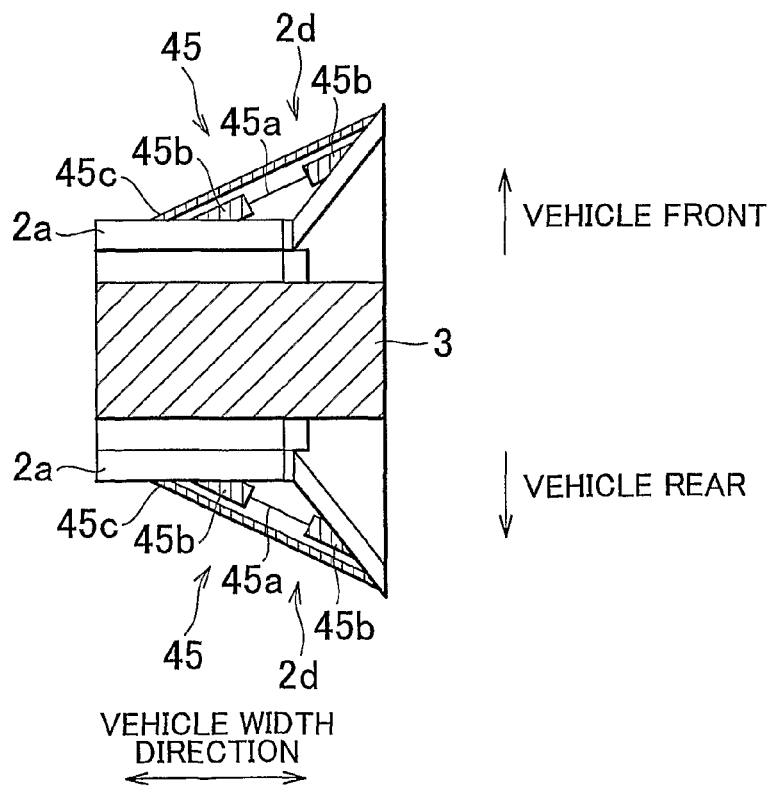
FIG. 16 is a diagram showing an example of the configuration in which conduction sensors are disposed on the part of a rack housing where stress concentration occurs.

Alternatively, the power steering system 1 may have conduction sensors 45 on the part of the rack housing 2 where stress concentration occurs, instead of the film sensor 35 (FIG. 16). In the conduction sensors 45, a connector 45b is connected to each end of a wire 45a, and the connectors 45b are attached to the part 2d where stress concentration occurs. In this case, when the rack housing 2 is deformed a predetermined amount or more, the connector 45b comes off, which results in disconnection. By checking the conduction state of the wire 45a, the contact detecting ECU 30 determines whether the rack housing 2 is deformed. A sensor cover 45c is attached on the outer periphery of the conduction sensors 45 so as not for the wires 45 to be broken by being snagged during assembly or travel, for example.

Figure 17:
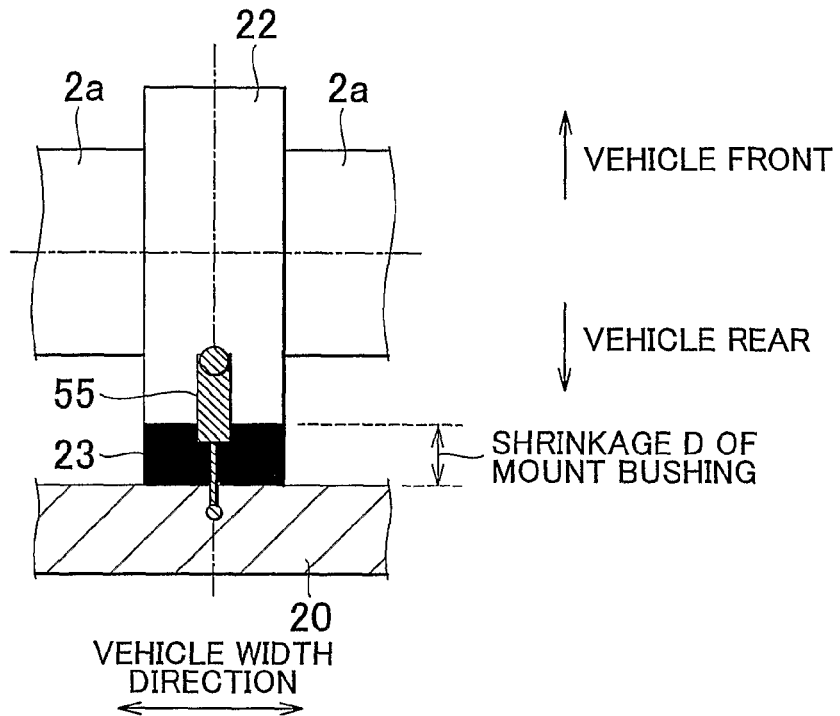
FIG. 17 is a diagram showing an example of the configuration in which a stroke sensor is disposed between a suspension member and an EPS mount.

In the sixth embodiment, a stroke sensor 55 may be disposed between the suspension member 20 and the EPS mount 22 (FIG. 17). The stroke sensor 55, of which the travel direction is the vehicle longitudinal direction, detects the shrinkage d of the mount bushing 23 exhibited when a peripheral member comes into contact with the rack housing 2, for example. The contact detecting ECU 30 can estimate the damage level of the rack housing 2, based on the shrinkage d of the mount bushings 23 detected by the stroke sensors 55.

Figure 18:
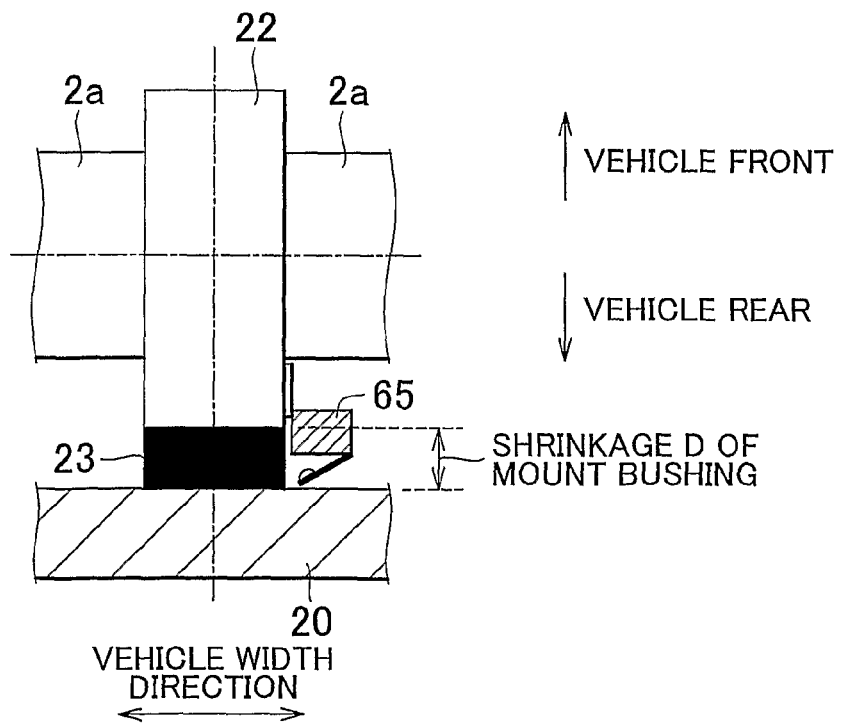
FIG. 18 is a diagram showing an example of the configuration in which a limit switch is disposed on the EPS mount.

The power steering system 1 may have a limit switch 65 disposed on the EPS mount 22, instead of the stroke sensor 55 disposed between the suspension member 20 and the EPS mount 22 (FIG. 18). The limit switch 65 outputs an ON signal when turned on, and outputs an OFF signal when turned off. When the shrinkage d of the mount bushing 23 becomes a predetermined amount or more, the limit switch 65 is turned on. As a result, the contact detecting ECU 30 can estimate the damage to the inside of the rack housing 2, for example, based on the output signals (the ON signal or the OFF signal) from the limit switches 65.

In the sixth embodiment, a G (acceleration) sensor 34 for detecting the acceleration (vibration) of the rack mechanism in the rack housing 2 may be disposed on the rack housing 2 (on the inner surface or the outer surface thereof) (FIG. 13). The G sensor 34 is disposed on the rack housing 2 on an upper, rigid part thereof, in order to avoid the influence of noise. The direction in which the acceleration is measured by the G sensor 34 is fixed in the vehicle longitudinal direction, which makes it possible to measure acceleration more accurately.

When it is determined that the acceleration detected by the G sensor 34 becomes equal to or greater than a threshold value, the contact detecting ECU 30 stops controlling the steering assist torque to be applied to the rack shaft 3 by sending a control signal to the ECU 31 for EPS. In this way, it is possible to surely prevent secondary failures or the like of the rack mechanism.

In the sixth embodiment, a load sensor(s) 75, such as a load washer, may be disposed between the EPS mount 22 and the suspension member 20, and/or on a fastening bolt 36 for fastening the EPS mount 22 to the vehicle body (FIG. 19). For example, when it is determined that the load detected by the load sensor 75 becomes equal to or greater than a threshold value, the contact detecting ECU 30 stops controlling the steering assist torque to be applied to the rack shaft 3 by sending a control signal to the ECU 31 for EPS. In this way, it is possible to surely prevent secondary failures or the like of the rack mechanism. The contact detecting ECU 30 can estimate the part to which the damage is large and the damage level of the inside of the rack housing 2, for example, by comparing the load output from the load sensors 75 and the map obtained through experiments.

In the sixth embodiment, by using the washer-type strain sensors 25, the film sensor 35, the conduction sensors 45, the stroke sensors 55, the limit switches 65, the G sensor 34, and the load sensors 75 in arbitrary combination, it is possible to estimate the damage level of the rack housing 2 more accurately.

In the sixth embodiment, a case where an object hits the rack housing 2 from the front thereof has been described mainly. However, an object can hit the rack housing 2 from the rear thereof, depending on the position in which the power steering system 1 is mounted. For example, in some cases, a heavy component, such as an engine assembly, moves forward due to the inertial force that occurs at the time of the vehicle collision, and hits the power steering system 1 mounted in front of the engine assembly. In this case, it is effective to detect the impact on the EPS mechanism with high accuracy as described above because there is a possibility that the inside of the rack housing 2 is damaged in spite of the fact that there is no flaw in the vehicle in appearance.

The present invention can be applied to a power steering system for a vehicle. There is no limitation on the appearance, the weight, the size, the running performance etc. of the vehicle on which the power steering system is mounted.

The invention claimed is:

1. A power steering system that allows a motor to boost steering torque, and transmits the steering torque to a wheel via a steering transmission mechanism, comprising:
    an impact detection device that detects an impact of an object on a rack housing that houses a rack bar constituting the steering transmission mechanism,
    wherein the impact detection device includes
    an angle detection device that detects a first rotational angle of a rotary member constituting the steering transmission mechanism, and
    an angular speed calculating device that calculates an angular speed of the rotary member based on the detected first rotational angle, and
    wherein the impact detection device detects the impact of a peripheral component on the steering transmission mechanism based on the calculated angular speed.

2. The power steering system according to claim 1, wherein the angle detection device includes a rotational angle sensor that detects a second rotational angle of the motor that assists a rack bar constituting the steering transmission mechanism in moving in an axial direction.

3. The power steering system according to claim 1, wherein the angle detection device includes a torque sensor that detects a steering torque based on a difference between rotational angles of a steering input shaft and an output shaft, which are connected to each other via a torsion bar constituting the steering transmission mechanism.

4. The power steering system according to claim 1, wherein the impact detection device detects the impact by discriminating a vibration due to the impact of the peripheral component on the steering transmission mechanism from a vibration that occurs in the steering transmission mechanism due to a backward input from the wheel.

5. The power steering system according to claim 4, wherein the vibration of the steering transmission mechanism due to the impact of the peripheral component is discriminated from the vibration of the steering transmission mechanism due to the backward input from the wheel, based on a changing pattern and/or frequency characteristics of an angular speed signal output from the angular speed calculating device.

6. The power steering system according to claim 4, wherein the vibration of the steering transmission mechanism due to the impact of the peripheral component is discriminated from the vibration of the steering transmission mechanism due to the backward input from the wheel by using an output signal from the torque sensor for detecting the steering torque.

7. The power steering system according to claim 4, wherein the vibration of the steering transmission mechanism due to the impact of the peripheral component is discriminated from the vibration of the steering transmission mechanism due to the backward input from the wheel by using a difference between the output signals each of which is sent from one of a pair of the rotational angle sensors one of which is provided for the steering input shaft, and the other of which is provided for the output shaft, the steering input shaft and the output shaft being connected to each other via the torsion bar.

8. The power steering system according to claim 1, wherein the impact detection device detects a displacement of the rack housing, relative to a vehicle body.

9. The power steering system according to claim 1, wherein,
when the impact detection device detects the impact of the object on the rack housing, a mode of controlling a steering assist torque to be applied to the rack bar is changed.

10. The power steering system according to claim 9, wherein
the change of the control mode includes a change of the operational state of an electric motor between a stopped state and a driven state.

11. The power steering system according to claim 1, wherein the motor to boost steering torque is an electric motor.

* * * * *